United States Patent
Kupka et al.

(10) Patent No.: US 7,246,246 B2
(45) Date of Patent: Jul. 17, 2007

(54) SYSTEM FOR KEYING PROTECTED ELECTRONIC DATA TO PARTICULAR MEDIA TO PREVENT UNAUTHORIZED COPYING USING A COMPOUND KEY

(75) Inventors: Michael S. Kupka, Nacogdoches, TX (US); Michael L. Hawkins, Nacogdoches, TX (US); Trent M. Thomas, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 867 days.

(21) Appl. No.: 10/359,864

(22) Filed: Feb. 7, 2003

(65) Prior Publication Data

US 2003/0221113 A1 Nov. 27, 2003

Related U.S. Application Data

(63) Continuation of application No. 09/191,689, filed on Nov. 13, 1998, now abandoned, which is a continuation-in-part of application No. 09/061,493, filed on Apr. 17, 1998, now abandoned.

(51) Int. Cl.
*H04L 9/00* (2006.01)
*H04N 7/167* (2006.01)

(52) U.S. Cl. ...................................... 713/189; 380/241

(58) Field of Classification Search ................ 713/189; 380/241

See application file for complete search history.

(56) References Cited

U.S. PATENT DOCUMENTS 4,757,534 A 7/1988 Matyas et al. ................ 705/56

(Continued)

FOREIGN PATENT DOCUMENTS

EP 0 302 710 A2 3/1989

(Continued)

OTHER PUBLICATIONS

Patent Abstracts of Japan, JP 10 333769 A, published Dec. 18, 1998, vol. 99(3), 1 page.

(Continued)

*Primary Examiner*—Kambiz Zand
*Assistant Examiner*—Peter Poltorak
(74) *Attorney, Agent, or Firm*—Stephen C. Beuerle; Procopio Cory Hargreaves & Savitch

(57) ABSTRACT

A system an method for distribution of electronic data over a network infrastructure that includes a client device for operation by a user desiring to receive the electronic data and server that contains the electronic data and offering the electronic data for downloading to the client device via the network infrastructure. The client device communicates a compound data key that includes a unique serial number associated with a particular piece of media to which the electronic data is to be stored to the server, vendor information and user information. The server encrypts the electronic data using the compound key, and downloads the encrypted electronic data to the client computer, where the client computer writes the encrypted electronic data to the particular piece of media such that the encrypted electronic data may only be accessed from the particular piece of media. The electronic data is decrypted for use by the apparatus or another device attached to the apparatus using the compound key as a data key, and the data is accessible from only the one piece of media having the unique serial number and is not accessible from any other media having a different or no identifier. In an alternate embodiment, the apparatus for reading the encrypted electronic data is connected to a general purpose computer having a media drive which reads the unique serial number and the electronic data from the one piece of media. The apparatus comprises an application specific integrated circuit which controls and executes instructions to accept the electronic data and the unique serial number from the general purpose computer.

4 Claims, 15 Drawing Sheets

U.S. PATENT DOCUMENTS

| | | | | |
|---|---|---|---|---|
| 4,827,508 A | 5/1989 | Shear | | 380/4 |
| 4,977,594 A | 12/1990 | Shear | | 380/4 |
| 5,010,571 A | 4/1991 | Katznelson | | 380/4 |
| 5,018,197 A | 5/1991 | Jones et al. | | 380/239 |
| 5,050,213 A | 9/1991 | Shear | | 380/25 |
| 5,058,162 A | 10/1991 | Santon et al. | | 380/25 |
| 5,097,504 A | 3/1992 | Camion et al. | | 380/23 |
| 5,282,247 A | 1/1994 | McLean et al. | | 380/4 |
| 5,291,598 A | 3/1994 | Grundy | | 395/650 |
| 5,319,705 A | 6/1994 | Halter et al. | | 380/4 |
| 5,392,351 A | 2/1995 | Hasebe et al. | | 705/51 |
| 5,400,319 A | 3/1995 | Fite et al. | | 369/275.5 |
| 5,450,489 A | 9/1995 | Ostrover et al. | | 380/3 |
| 5,469,564 A | 11/1995 | Junya | | 395/188.01 |
| 5,490,216 A | 2/1996 | Richardson, III | | 380/4 |
| 5,502,766 A | 3/1996 | Boebert et al. | | 380/25 |
| 5,533,125 A | 7/1996 | Bensimon et al. | | 380/4 |
| 5,553,143 A | 9/1996 | Ross et al. | | 380/25 |
| 5,555,304 A | 9/1996 | Hasebe et al. | | 380/4 |
| 5,563,946 A | 10/1996 | Cooper et al. | | 380/4 |
| 5,592,549 A | 1/1997 | Nagel et al. | | 380/4 |
| 5,629,980 A | 5/1997 | Stefik et al. | | 380/4 |
| 5,634,012 A | 5/1997 | Stefik et al. | | 395/239 |
| 5,638,443 A | 6/1997 | Stefik et al. | | 380/4 |
| 5,677,952 A | 10/1997 | Blakley, III et al. | | 380/4 |
| 5,677,953 A | 10/1997 | Dolphin | | 380/4 |
| 5,682,428 A | 10/1997 | Johnson | | 380/23 |
| 5,699,428 A | 12/1997 | McDonnal et al. | | 380/4 |
| 5,708,709 A | 1/1998 | Rose | | 380/30 |
| 5,715,313 A | 2/1998 | Tsukuda et al. | | 380/22 |
| 5,727,061 A | 3/1998 | Johnson et al. | | 380/25 |
| 5,734,823 A | 3/1998 | Saigh et al. | | 395/200.06 |
| 5,734,891 A | 3/1998 | Saigh | | 395/610 |
| 5,734,923 A | 3/1998 | Saigh et al. | | 395/200.06 |
| 5,754,649 A | 5/1998 | Ryan et al. | | 380/4 |
| 5,757,908 A | 5/1998 | Cooper et al. | | 380/4 |
| 5,758,068 A | 5/1998 | Brandt et al. | | 395/186 |
| 5,774,545 A | 6/1998 | Raghavachari | | 380/4 |
| 5,778,068 A | 7/1998 | Johnson et al. | | 380/25 |
| 5,796,824 A | 8/1998 | Hasebe et al. | | 380/4 |
| 5,805,699 A | 9/1998 | Akiyama | | 380/25.49 |
| 5,828,754 A | 10/1998 | Hogan | | 380/49 |
| 5,857,021 A | 1/1999 | Kataoka et al. | | 380/4 |
| 5,872,784 A | 2/1999 | Rostoker et al. | | 370/395 |
| 5,923,146 A | 7/1999 | Martenson | | 363/146 |
| 5,923,147 A | 7/1999 | Martenson | | 363/146 |

FOREIGN PATENT DOCUMENTS

| | | |
|---|---|---|
| EP | 0 561 685 A2 | 9/1993 |
| EP | 0 598 589 A | 5/1994 |
| EP | 0 665 486 A2 | 8/1995 |
| EP | 0 679 980 A1 | 11/1995 |
| EP | 0 795 809 A | 9/1997 |
| EP | 0 844 550 A | 5/1998 |
| TW | 295656 | 1/1997 |
| WO | WO 95/35533 | 12/1995 |
| WO | WO 96/35158 | 11/1996 |
| WO | WO 97/14087 | 4/1997 |
| WO | WO 97/29416 | 8/1997 |
| WO | WO 98/02793 | 1/1998 |
| WO | WO 98/43398 | 10/1998 |

OTHER PUBLICATIONS

"Software Copy-Protection Method using Serial Number of Disk Storage", IBM Technical Disclosure Bulletin, vol. 38, No. 12, Dec. 199r (Dec. 1995, pp. 91-92, XP000588081, New York, US, Abstract.

FIG. 8

Iomega Transaction File (ITF) File format specification
version 0.1

MetaTags

1. ITFVERSION: ITF Format Version number specified in n.n major, minor format. Example is <ITFVERSION>: 0.1

2. ITFNEWFILE: This Metatag indicates a new block of Metatags and Metadata follows. Should be the first Metatag following the ITFVERSION Metatag. This Metatag is designed to allow compound ITF Files which may be used for Batch Downloads.

3. ITFFID: This tag hold the database id for this item.

4. ITFSERVER: Specifies the IP Link to the server that contains the file to be processed. May be DNS entry or IP number. Prefer IP number so we don't have to relay on DNS translation.

5. ITFFILENAME: The name of the file to be processed.

6. ITFARTIST: The song artist. May be multiply name comma delimited.

7. ITFTITLE: The song title.

8. ITFALBUM: The name of the album the song is from.

9. ITFCOST: This tag contains the item's cost.

10. ITFDATE: Date file was created, or last updated. Mm/dd/yy

11. ITFSIZE: This tag contains the file size of the item.

Usage Rule
1. All Metatags are begin with the Less than sign '<' and end with colon greater htat ':>'.
2. All Metatags must begin in the first column of a line.
3. Metadata immediately follows the closing :> of the Metatag and ends with either a new Metatag or the end of file. This allows the usage of any characters or text sequence including the characters used to delimit the Metatag itself. Caveat, do not attempt to embed a Metatag inside Metadata if the embedded Metatag begins on a new line.

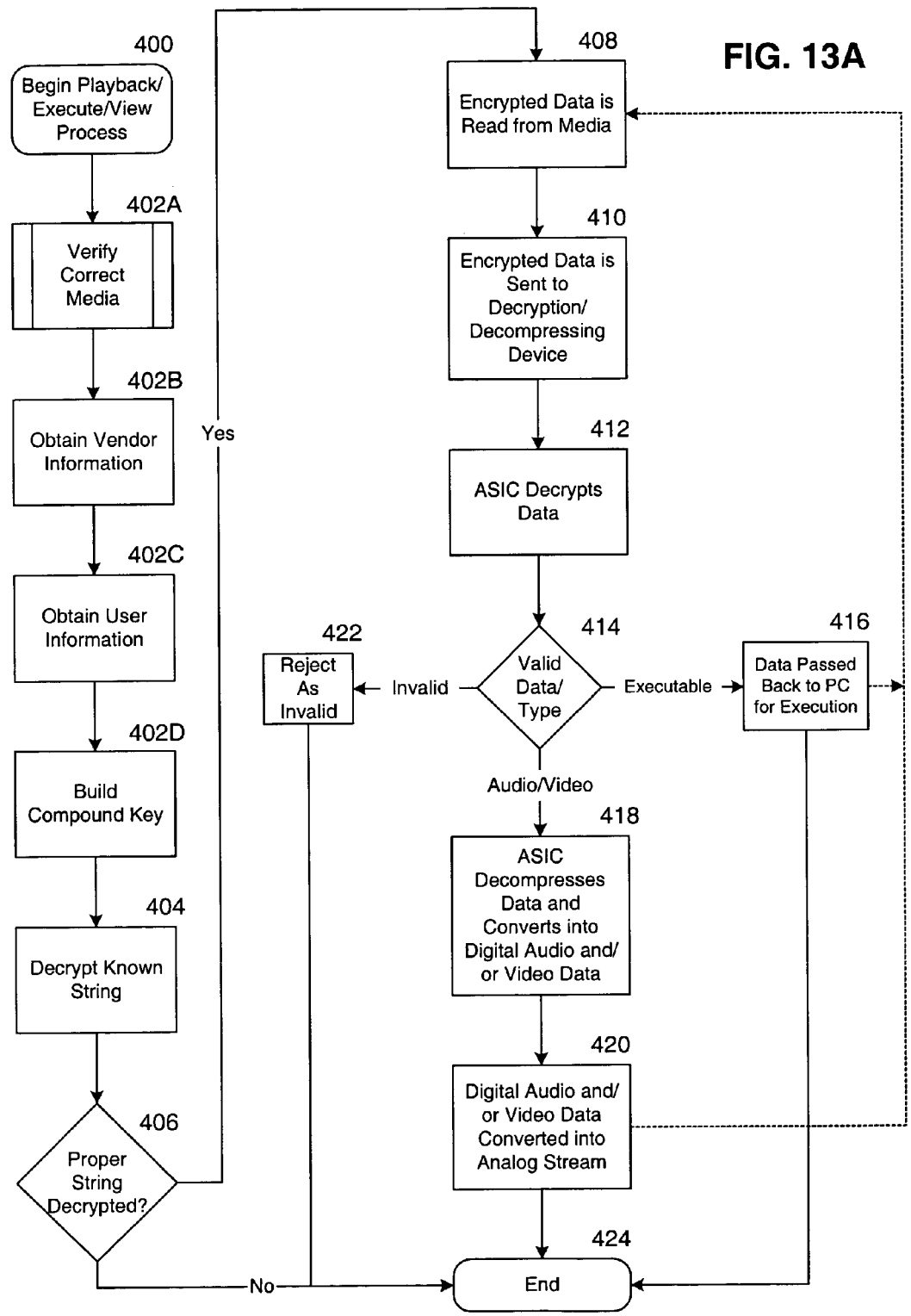

SYSTEM FOR KEYING PROTECTED ELECTRONIC DATA TO PARTICULAR MEDIA TO PREVENT UNAUTHORIZED COPYING USING A COMPOUND KEY

CROSS-REFERENCE TO RELATED APPLICATIONS

The present application is a continuation of U.S. patent application Ser. No. 09/191,689, filed Nov. 13, 1998, now abandoned, entitled "System for Keying Protected Data to Particular Media to Prevent Unauthorized Copying Using a Compound Key", which is a continuation-in-part of U.S. patent application Ser. No. 09/061,493, filed Apr. 17, 1998, now abandoned, entitled "System for Keying Protected Electronic Data to Particular Media to Prevent Unauthorized Copying."

FIELD OF THE INVENTION

The present invention relates to the prevention of unauthorized copying by associating electronic data to a particular piece of storage media. In particular, the present invention relates to a remote data delivery system wherein electronic data to be protected is delivered in a secure manner to a local machine which stores and permanently associates the protected electronic data to a particular piece of storage media based on a composite key using at least a unique identifier of the media.

BACKGROUND OF THE INVENTION

Protection of copyrighted and other protected digitally stored data has always been a primary concern of the owners of such material. In particular, piracy of computer software, music and video has been and continues to be of great concern because it is all but impossible to stop. Although there have been many prior attempts by the software, music, and video industries to curtail piracy, each has been met with limited success.

As part of the effort to combat piracy, software vendors have licensed software 5 rather than transferring ownership when purchased. When software is purchased, the purchaser becomes a licensed user (i.e., licensee) rather than an owner. Copying of software under most license agreements is generally limited to one copy for backup purposes only in order to legally restrict unlimited copying. In addition, the software license typically grants a right to use the software on a single computer or for use by only one user at any time.

Software vendors have also attempted to combat software piracy by copy-protecting their software. While this attempt was effective to some extent, it failed because users were unable to make backup copies. Also, soon after the first copy-protected computer software was on the market, other programs to copy the copy-protected software became available. Other copyright protection methods were then developed in an attempt to stop piracy, also with limited success. These attempts included requiring a master floppy disk to be inserted into the computer or requiring the user to enter a key or other information contained in the user manual or license agreement when executing the software from the computer's hard drive. Still others required a hardware key to be present in the computer's parallel port, which was read when the software was executed. Software vendors received a temporary reprieve when CD-ROMs became the standard media for digital storage and distribution of software, because applications grew to be so large that the only means for copying the software was to "burn" duplicates on expensive recordable CDS. However, the prices of recordable CDS and the drives to write recordable CDS have fallen dramatically and pirates can once again produce cheap illegal copies of protected software.

The music and video industries have a different concern than the software vendors. These industries are particularly concerned with pirates making perfect copies of digitally stored music and videos. While copying of music and video for non-commercial purposes is allowed, such copying has historically been performed by tape decks and video cassette recorders using analog recording techniques. Analog reproduction results in decreasing quality with every generation, whereas digital copies are exact and suffer no fidelity loss. As noted, prices of recordable CDS and the drives to write to recordable CDS have fallen dramatically and these drives can just as easily record music to the CDS as they record software and data. Further, with the advent of the Digital Versatile Disk (DVD), full length motion pictures may now be recorded to a single DVD disk. As a result, the music and 5 video industries also have a growing need to prevent copying of digitally recorded works.

Fueling the concern of software vendors and the music and video industries is the rapid growth of the digital age and global communications. In the early 1980's when the personal computer (PC) was in its infancy and software vendors first attempted to protect their intellectual property, there were few, if any, mass distribution channels. At the same time period, the music and video industries were strictly analog at the consumer level. Thus, piracy was not a major factor as it was limited to small groups of people or organizations. However, with powerful computers on every desktop and the evolution of music and video into a digital format, piracy has become a major factor costing software vendors alone $4 billion a year worldwide. Clearly, the financial loss to software developers, musicians, actors, and their associated industries is immense.

At the root of the global communications expansion is the rapid growth of the Internet, which has pushed the piracy problem to the forefront. As is well known in the art, the term "Internet" was first used in 1982 to refer to the enormous collection of inter-connected networks that use Transmission Control Protocol/Internet Protocol (TCP/IP) protocols. Despite only gaining mass recognition over the past four years, the Internet has existed since the late 1960's and was originally designed as a Wide Area Network (WAN) that would survive a nuclear war. Throughout the 1970's and 1980's a growing number of small networks developed and connected to the Internet via gateways as a means of exchanging electronic mail. In the mid 1980's there was a significant growth in the number of available Internet hosts, and since the late 1980's, the growth of the Internet has been exponential. The growth of the Internet has provided people all over the world with a means to share and distribute information. Thus, the potential now exists for the mass distribution of pirated software, music and video on a global scale. Many Internet Usenet groups and channels on the Internet Relay Chat (IRC) are dedicated to the trading of pirated files, music and videos. Furthering the piracy problem are groups that maintain a high profile and take a great deal of pride in their piracy accomplishments. The piracy problem has grown so large that a new term, "warez," is used to describe the pirated materials. The Internet now provides a great potential for legitimate sales and distribution of protected software, music and videos, because of its size, speed and penetration into the homes of consumers. However, these very advantages make it easy for pirates to steal expensive, proprietary software that took years to design and manufacture and within hours make it available to anyone, free for the taking.

In view of the above, there is a need for a secure method and apparatus for electronic distribution of data which will take advantage of the wide distribution of networks such as the Internet, while simultaneously preventing unauthorized and illegal copies of protected works, data and applications. In particular, there is a need for a method and apparatus which will provide vendors of software, music and videos with a secure means of electronically distributing their works and applications over the large networks, while ensuring that their protected works and applications are not copied and pirated. Such a method and apparatus would also ensure that the rights of owners of intellectual property are protected and that owners are properly compensated for their creative efforts.

SUMMARY OF THE INVENTION

In view of the above, the present invention, through one or more of its various aspects and/or embodiments is thus presented to accomplish one or more objects and advantages, such as those noted below.

According to an aspect of the invention, there is provided a method of electronically distributing electronic data from a server to a client device via a network infrastructure. The method utilizes a compound key that includes a unique identifier of one piece of media to associate the electronic data with only the one piece of media. The method comprises establishing a connection between the client device and the server via the network infrastructure; transmitting, via the network infrastructure, the compound key; encrypting, at the server, the electronic data to be communicated to the client; communicating, via the network infrastructure, the electronic data to the client device, wherein the electronic data is in an encrypted format; and writing, at the client device, the electronic data to the one piece of media, such that the information may be accessed for use from only the one piece of destination media.

According to a feature of the invention, transmitting the compound key to the server comprises accessing the one piece of destination media; reading the unique identifier from a predetermined location on the one piece of destination media; obtaining vender information; obtaining user information; building the compound key through a predetermined operation using the unique identifier, the vendor information, and the user information; and formatting the compound key into a first data structure for communication to the server. The predetermined location on the one piece of destination media may be a predetermined track.

According to another feature, the encrypting of the electronic data to be transmitted to the client device comprises encrypting at least one of the electronic data and an encryption key to the electronic data, the encrypting being performed in accordance with. The compound key as a data encryption key. The method as may further comprise communicating additional information to the remote server; and encrypting additional information together with the electronic data, the additional information comprising at least one of a purchaser's name, address, telephone number, and payment information.

According to a further feature, the electronic data is written to the one piece of destination media in an encrypted format using the compound as a decryption key.

According to still another feature, establishing a connection between the client device and the server via the network infrastructure comprises submitting, from the client device, a form to the server; executing, at the server, a program to process the form; and sending, to the client, a metatag and transaction file. The metatag and the transaction file together launch a client program at the client device after being sent to the client device. e client program opens the transaction file and parses metadata from metatags within the transaction file, and wherein the client connects to a server address identified by a predetermined metatag in the transaction file to receive the electronic data. In addition, the server address may be dynamically changed as the electronic data is requested from the server.

According to another aspect of the invention, there is provided a method of accessing electronic data stored on a media by a first device adapted to read the media, the electronic data having been written to the media in an encrypted format. The method comprises accessing the electronic data on the media; building a compound key in accordance with a predetermined operation; reading at least a portion of the electronic data from the media; and decrypting the electronic data using the compound key as a decryption key.

According to a feature of the invention, building the compound key comprises reading a unique identifier from a predetermined track of the media, obtaining vendor information and obtains user information. The unique identifier, the vendor information and the user information are combined by the predetermined operation into the compound. Building the compound key may further comprise communicating the compound key to a second device, and the reading at least a portion of the electronic data may further comprise communicating the portion of the electronic data to the second device. The second device performs the decrypting the electronic data using the compound key as a decryption key.

According to a further feature, the method comprises communicating, from the second device to the first device, an authentication code to the first device; reading, at the first device, a unique identifier from the media; comparing the authentication code to the unique identifier, and if the authentication code equals the unique identifier, generating a verification code which is communicated to the second device.

According to another feature, the method further comprises reading a predetermined string from the media; decrypting the predetermined string; comparing the predetermined string with a known string; and halting the method if the predetermined string does not equal the known string.

According to yet another aspect of the present invention, there is provided a system for distribution of electronic data over a network infrastructure comprising at least one client device for operation by a user desiring to receive the electronic data; and at least one server, the at least one server containing the electronic data and offering the electronic data for downloading to the at least one client device via the network infrastructure. The at least one client device communicates a compound key to the at least one server, the compound key including a unique identifier associated with a particular piece of media to which the electronic data is to be stored. The at least one server encrypts the electronic data using the compound key as a data key and downloads the encrypted electronic data to the at least one client computer. The at least one client computer writes the encrypted electronic data to the particular piece of media such that the encrypted electronic data may only be accessed from the particular piece of media.

According to a feature of the invention, the at least one client device further submits a form to the at least one server, and the form is processed by the at least one server 5 and the server communicates a metatag and transaction filed to the at least one client.

According to another feature of the invention, the metatag and the transaction file launch a client program at the at least one client device after being communicated to the at least one client. The client program opens the transaction file and parses metadata from metatags within the transaction file, and the at least one client connects to a server address identified by a predetermined metatag in the transaction file to receive the electronic data. Additionally, the server address may be dynamically changed by the at least one server as the electronic data is requested from the at least one server.

According to yet another aspect of the invention, there is provided an apparatus for reading encrypted electronic data associated to one piece of media by a compound key that includes at least a unique identifier contained on the one piece of media. The apparatus includes a processor which controls and executes instructions to read the electronic data and the unique identifier from the one piece of media, and a media drive, responsive to the processor, which reads the unique identifier. The electronic data is decrypted for use by the apparatus or another device attached to the apparatus using the compound key as a data key, and the data is accessible from only the one piece of media having the unique identifier and the data is not accessible from any other media having a different or no identifier.

According to a feature of the invention, the apparatus further comprises an application specific integrated circuit, which performs the decryption. The decrypted electronic data may be passed to the apparatus from the application specific integrated circuit.

According to another feature, the apparatus includes an analog to digital converter that decompresses the electronic data and the analog to digital converter converts the decompressed electronic data into audio signals.

According to yet another feature, the media drive reads a predetermined string from the media, and the processor decrypts the predetermined string and compares the predetermined string with a known string, and the apparatus is halted if the predetermined string does not equal the known string.

According to a further feature, the compound key comprises the unique identifier, vendor information and user information.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like reference numerals represent similar parts throughout the several views of the drawings, it being understood, however, that the invention is not limited to the specific methods and instrumentalities disclosed. In the drawings:

FIG. 8 is an exemplary format of a file containing parameters that are passed to a client program which controls a data download process;

FIGS. 13A and 13B are flow charts of the processes performed by the decryption/decompressing device during the read/playback of data in accordance with the second embodiment of the present invention.

DETAILED DESCRIPTION OF THE PREFERRED EMBODIMENTS

The present invention provides for a secure method of transmitting sensitive and protected electronic data (protected content) from a remote server to a client computer or stand-alone device over a network infrastructure and for preventing the unauthorized distribution and copying of the data once it is delivered to the client computer or stand-alone device. As used herein, the term "data" includes all information that may be stored on a storage media, including but not limited to, executable files, linked library files, data files, databases files, audio files, and video files.

Figure 1:
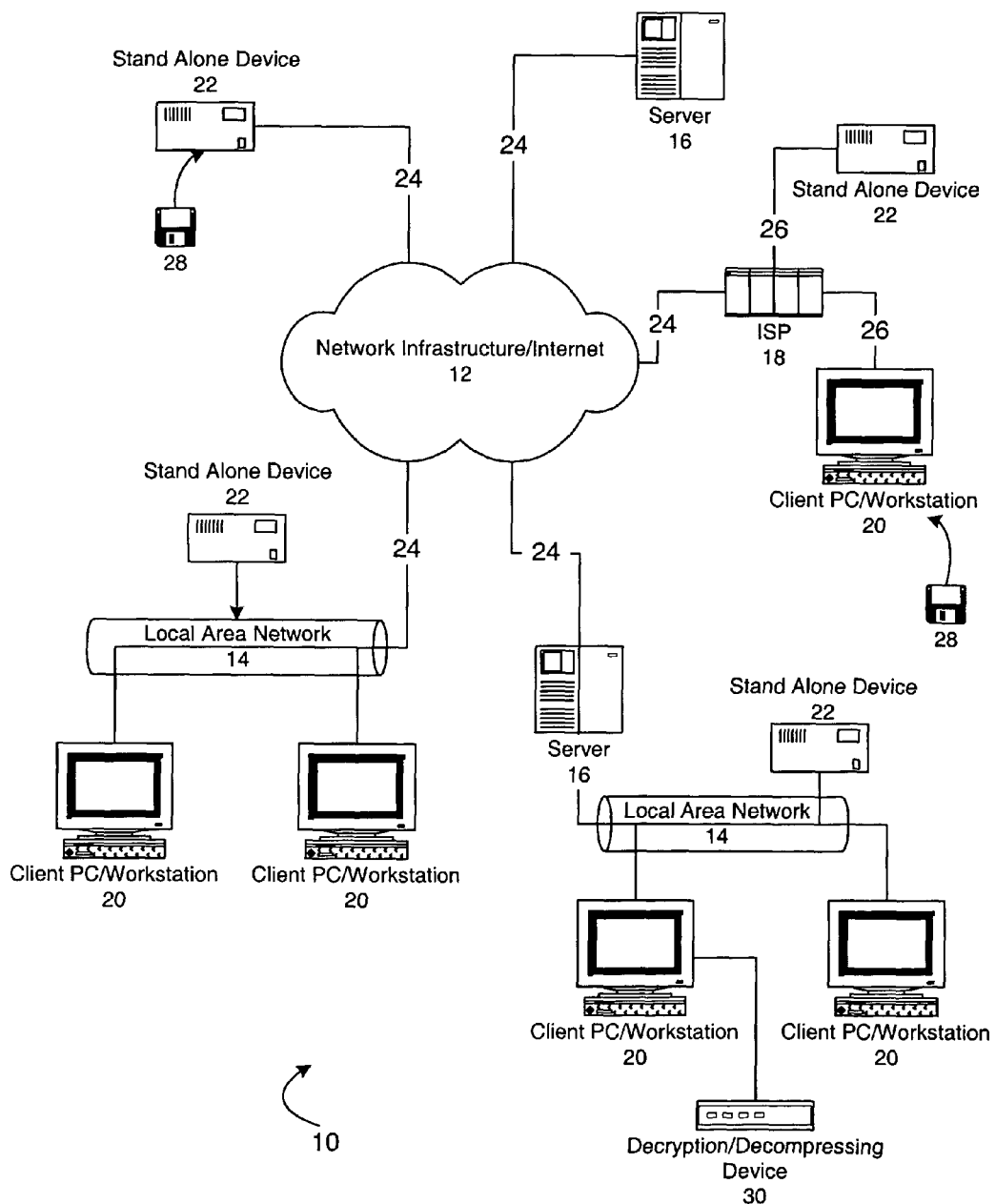
FIG. 1 is an exemplary computer network environment in which the present invention may be implemented.

Referring to FIGS. 1-5, there is illustrated an exemplary, non-limiting, environment 10 and devices in which the present invention may be implemented. As shown in FIG. 1, the environment 10 includes a Wide Area Network (WAN) infrastructure 12. The WAN infrastructure 12 may comprise a Transmission Control Protocol/Internet Protocol (TCP/IP) network such as the Internet. Attached to the WAN infrastructure 12, via communications lines 24, may be one or more Local Area Networks (LAN) 14, servers 16; Internet Service Providers 18, and stand alone devices 22 that are compatible with the protocols of the WAN infrastructure 12. As illustrated, the LAN 14 and ISP 18 may have attached thereto client PC/workstations 20 and/or stand alone devices 22 that may access the network infrastructure 12 via the LAN 14 or ISP 18, and that are capable of at least accessing and reading data on a removable media 28. Also shown is a data decryption/decompressing device 30, which is attached to a PC/workstation 20 over bus 32.

The LAN 14 may comprise an Ethernet or Token Ring network and have a 10 server 16 and gateway (not shown) that provides a connection to the network infrastructure 12 via one or more communications links 24. The communication links 24 to the remote systems may be wireless links, satellite links, or dedicated lines.

The servers 16 may comprise, for example, UNIX-based or Windows NT Server-based computer platform having one or more processors (e.g., Intel Pentium II processor, Digital Equipment Company Alpha RISC processor, or Sun SPARC Processor), long-term storage (e.g., a RAID disk array), random access memory (RAM), communication peripherals (e.g., network interface card, modem, and/or terminal adapter), and application programs (e.g., database software applications, World Wide Web publishing/hosting software, and inventory management software) which may be used to distribute information to the client PC/workstations 20, stand alone devices 22, and other servers 16. The servers 16 may be configured as, for example, World Wide Web (WWW) servers, File Transfer Protocol (FTP) servers, electronic mail (E-mail) servers, etc. The ISP 18 typically is an organization or service that provides access to the Internet (network infrastructure 12) via a server (not shown) connected to the Internet by communications link 24. In exemplary embodiment of FIG. 1, the client PC 20 or stand alone device 22 may utilize a dial-up connection 26 (via the public switched telephone network) to connect to the ISP 18.

The client PCs 20 may comprise Windows 95, Windows 98 or Windows NT Workstation-based personal computers having an Intel Pentium processor or higher, long-term storage (e.g., a IDE or SCSI hard disk), a removable media drive (e.g., CD-R, DVD-RAM, or other removable floppy or hard disk drive), random access memory (RAM), communication peripherals (e.g., network interface card, modem, and/or terminal adapter), and suitable application programs (e.g., Dial-up networking software and a Web Browser). If configured as a workstation, the workstations 20 may comprise, for example, UNIX-based IBM RS/6000 or SUN SPARCStation workstations. Further, the client PC/workstations 20 5 may comprise the so-called "network computing" devices.

Figure 2:
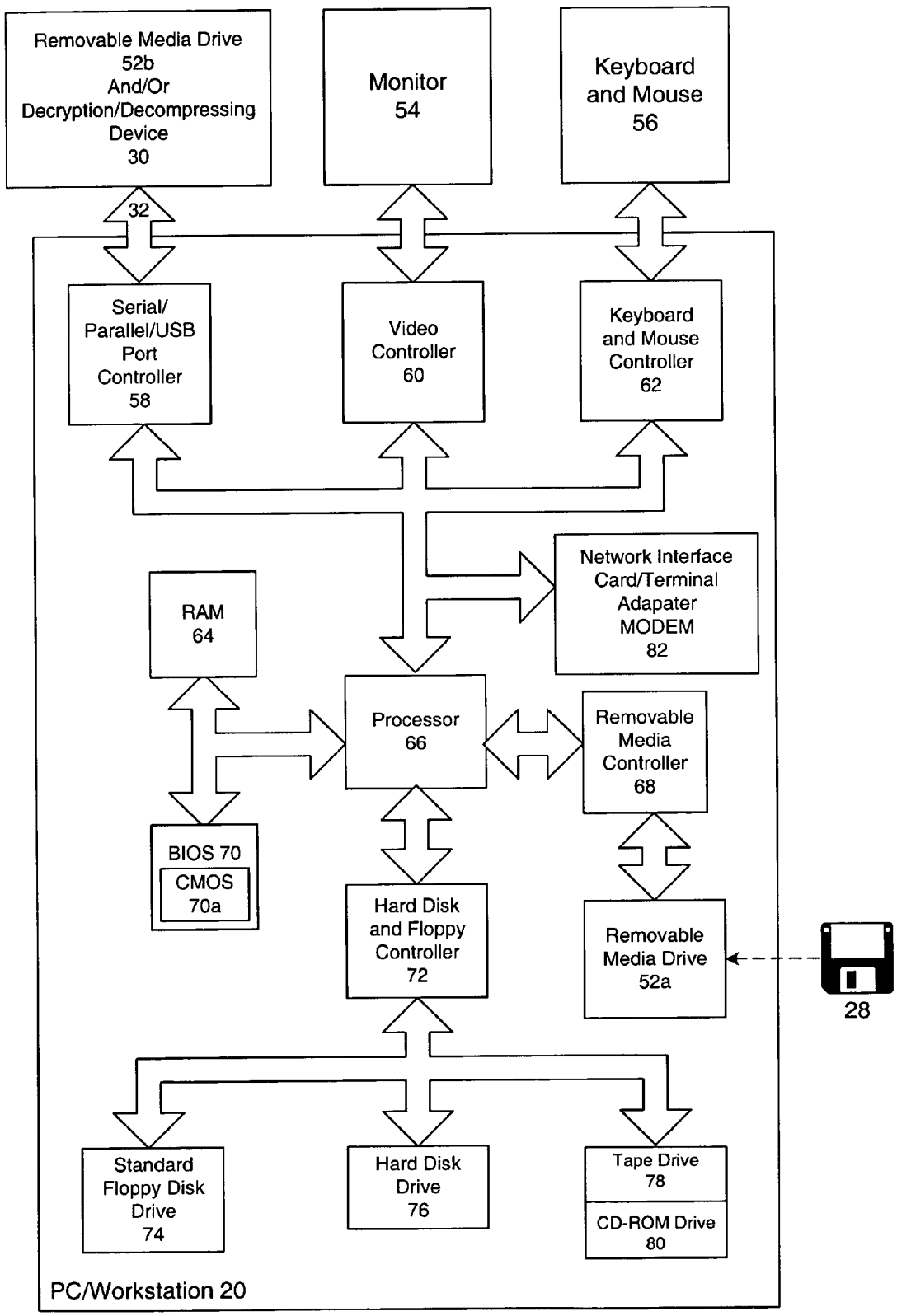
FIG. 2 is a block diagram of the components of a client PC/Workstation shown in FIG. 1.

A block diagram of an exemplary PC/Workstation 20 is illustrated in FIG. 2. As shown, the PC/Workstation 20 is divided between internal and external components. The internal components include a Basic Input/Output System (BIOS) 70 and a processor (CPU) 66 that control the overall functioning of the PC/Workstation 20. Memory 64, a hard disk drive 76, a floppy disk drive 74, a tape drive 78, a CD-ROM drive 80, a ODEM/Terminal Adaptor/Network Interface Card 82, and a removable media drive 52a are also connected to the CPU 66. The removable media drive 52a or 52b operates to read and/or write to a storage media contained within a removable storage cartridge 28. The exemplary PC/workstation 20 of FIG. 2 is configured with two removable media drives 52a and 52b to emphasize that a removable media drive can be implemented in either internal or external form.

The MODEM/Terminal Adaptor/Network Interface Card 82 may comprise individual cards performing communications-related functions, as known in the art. The MODEM/Terminal Adaptor/Network Interface Cards 82 are included within PC/workstation 20 to provide communications to external networks to which the PC/workstation 20 is connected. In particular, the MODEM/Terminal Adaptor/Network Interface Card 82 may be used to access LAN 14, ISP 18 and network infrastructure 12.

Communications between internal and external devices may be accomplished via controllers provided within the PC/workstation 20. A serial/parallel/USB port controller (which may comprise separate controllers) 58, a monitor controller (video card) 60, and a keyboard and mouse controller 62 each provide an interface between the CPU 66 and an external removable media drive 52b (or printer), monitor 54, and keyboard and mouse device 56, respectively. A hard disk and floppy disk controller 72 serves as an interface between the CPU 66 and the hard disk 76 and the CD-ROM drive 80, and the floppy disk 74 and tape drive 78, respectively. It will be appreciated by those skilled in the art that the disk controller 72 may comprise separate floppy and hard disk controllers (e.g., IDE or SCSI controller).

A removable media controller 68 serves as an interface between the removable media drive 52a and the CPU 66. For example, the removable disk controller 68 may comprise a Small Computer System Interface (SCSI) or Integrated Drive Electronics (IDE) interface controller. A hard disk and floppy disk controller 72 serves as an interface between the CPU 66 and the hard disk 76 and the CD-ROM drive 80, and the floppy disk 74 and tape drive 78, respectively. Alternatively, the removable media drive 52a may utilize the disk controller 72 as an interface to the CPU 66.

Figure 3:
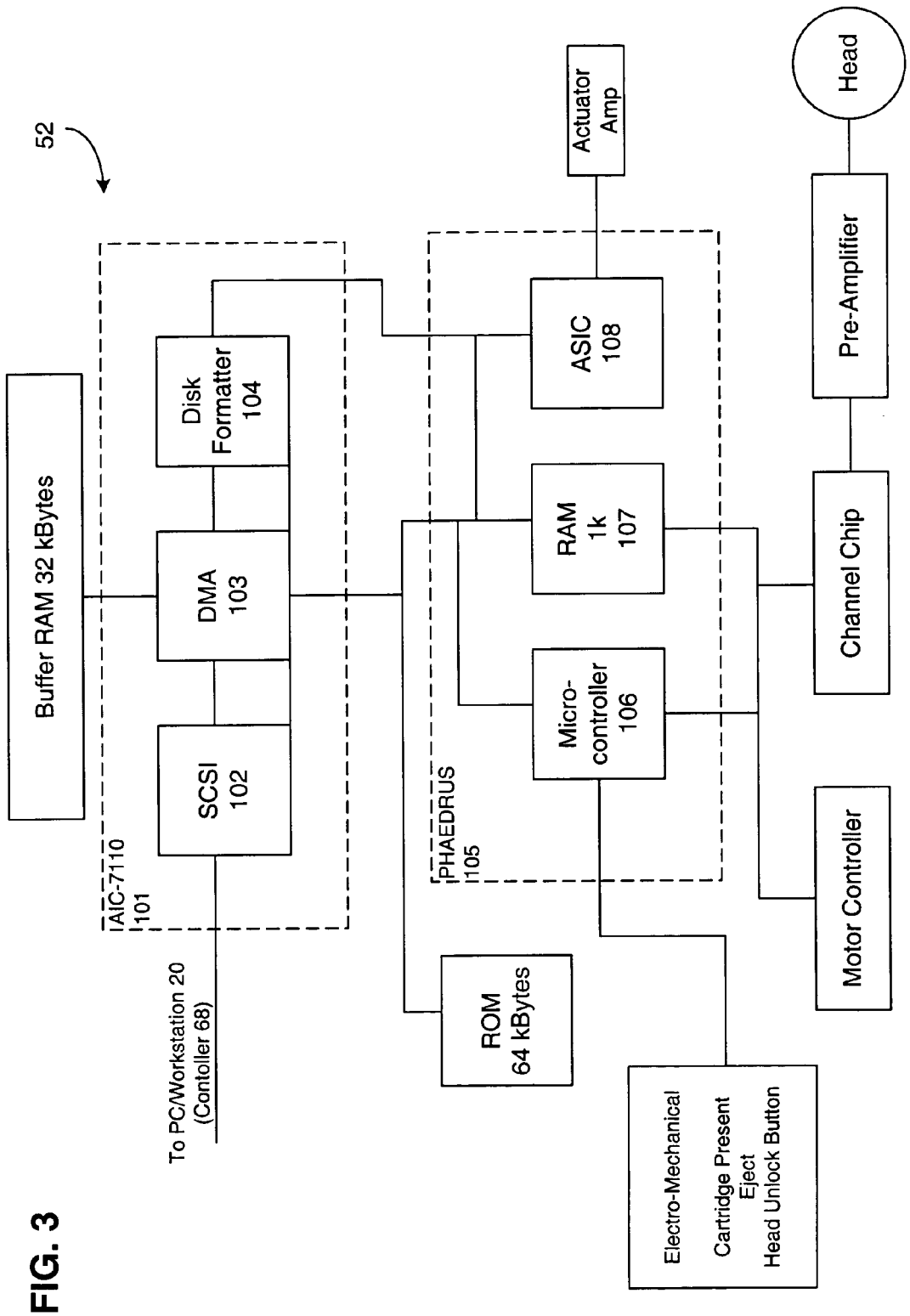
FIG. 3 is a block diagram of the components of a preferred media drive shown in FIG. 2.

Referring now to FIG. 3, there is illustrated a block diagram of an exemplary media drive 52 having a SCSI interface to the PC/workstation 20 (via controller 68). The media drive 52 preferably comprises, a ZIP® drive, manufactured by Iomega Corporation, Roy, Utah; however, other media drives may be used as media drive 52. The media drive 52 includes components that provide for communication between the read/write channel for the 15 media (lower right side of diagram) and the PC/workstation 20 (upper left side of diagram). The media drive 52 includes an AIC chip 101 which performs the SCSI 102, the direct memory access (DMA) 103, which is in communication with Buffer RAM 103a, and disk formatter 104 functions. The interface also includes PHAEDRUS 105 which includes an 8032 microcontroller 106, a 1 kByte RAM 107, which is in communications, with ROM 107a and DMA 103, and an application specific integrated circuit (ASIC) 108. Microcontroller 106 responds to the electromechanical cartridge present unlock button 106 and controls motor controller 109, channel chip 110 preamplifier 111 an head 112 as is conventional in drives such as the aforementioned ZIP® drive. The ASIC 108 may perform various functions, such as servo sequencing, control of actuator Amp 108a data splitting, EOC, ENDEC, A-to-D, and D-to-A conversion. The communication between the media drive 52 and the PC/workstation 20 is accomplished through transfers of data between the input/output channel of the media drive 52 and the media controller 68 (e.g., SCSI controller) of the PC/workstation 20.

Referring again to FIG. 1, the stand alone devices 22, as used herein, may 25 encompass any device capable of interacting with the network infrastructure 12, other than the "traditional" computing device (i.e., PCS, workstations, network computers, or terminals). For example, the stand alone device 22 may include devices such as WebTV®, available from WebTV Networks, Palo Alto, Calif., a music or video player, etc. It is noted that the stand alone device need not be provided with a communications connection to the network infrastructure, LAN, or ISP.

Figure 4:
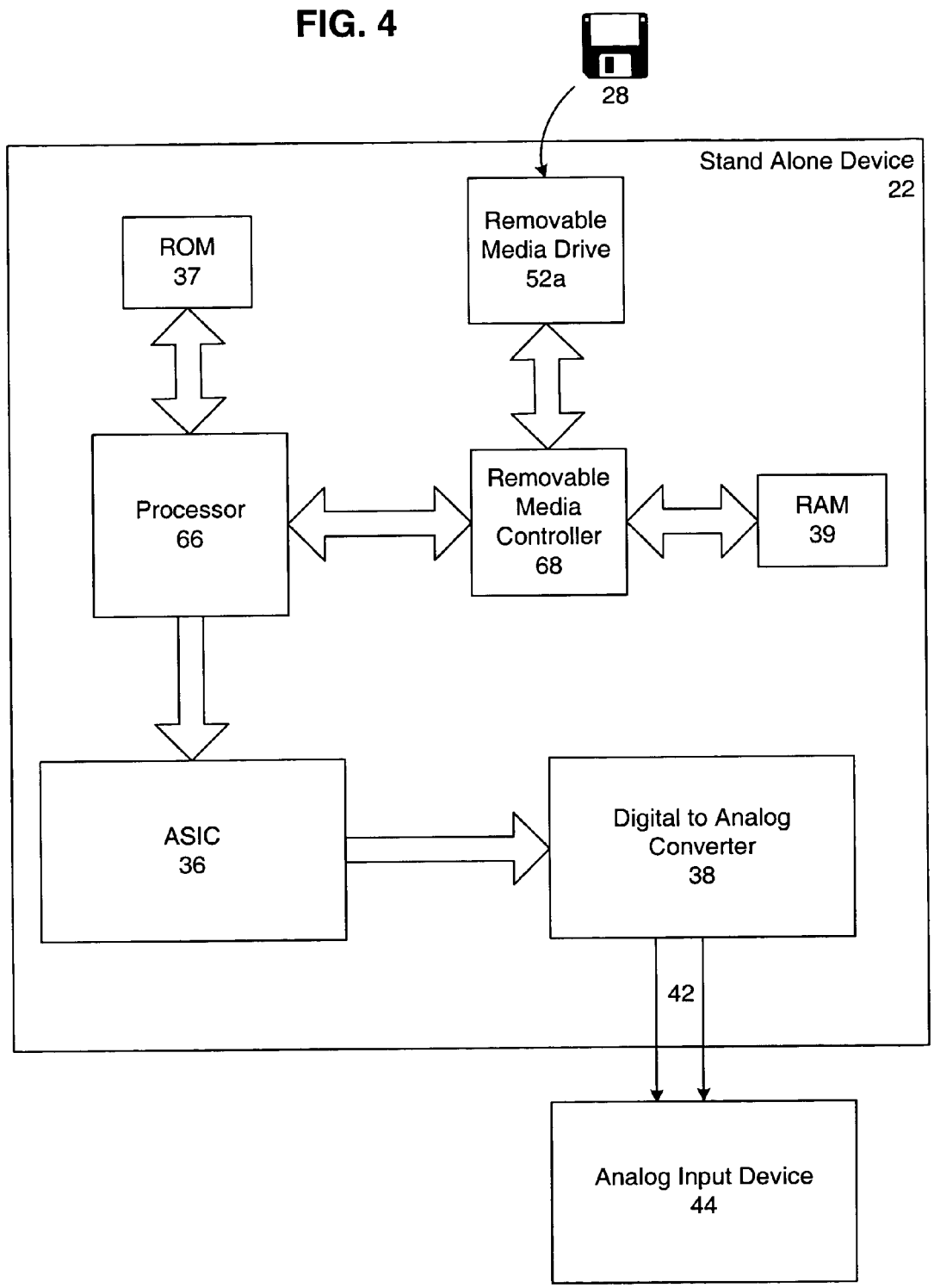
FIG. 4 is a block diagram of the components of an exemplary stand alone device shown in FIG. 1.

A block diagram of an exemplary stand alone device 22 is illustrated in FIG. 4. The exemplary stand alone device 22 includes a removable media drive 52a, a removable media controller 68, a CPU 66, an ASIC/controller 36, a digital to analog converter 38, ROM 37, and RAM 39. As can be appreciated by one of skill in the art, the stand alone device 22 of FIG. 4 may operate as a "player" or "viewer" of the protected data by reading the protected data from the media 28. The removable media drive 52a, the removable media controller 68, and CPU 66 each operate as described in the PC/Workstation 20 of FIGS. 1-3. ROM 37 contains instructions to control the operation and functions of the stand alone device 22. The ASIC/controller 36 may be used decrypt the protected data and output digital audio and/or video signals (e.g., Pulse Code Modulation (PCM)) to the digital to analog converter 38 for conversion to analog audio or video signals applied over bus 42 to analog input device 44.

Referring again to FIG. 1, there is illustrated a decryption/decompressing device 30 in accordance with the present invention, which is connected to the PC 20 to perform the reading/playback/execution of the protected electronic data. The decryption/decompressing device 30 differs from the stand alone device 22 in that the decryption/decompressing device 30 is not provide with a device (e.g., removable media drive 52) to read the media 28, but rather receives data which is read by, and communicated from, the PC/workstation 20.

Figure 5:
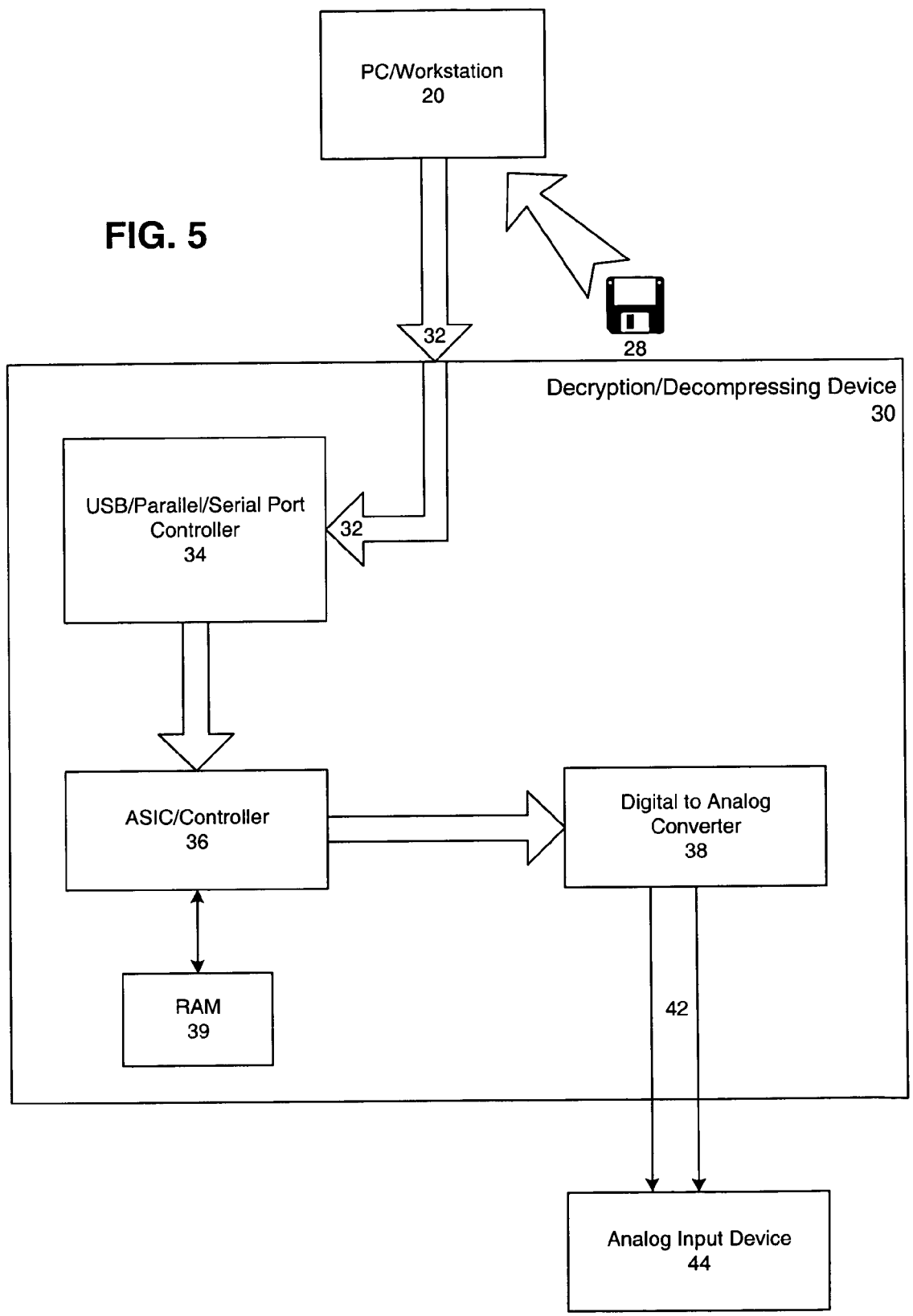
FIG. 5 is a block diagram of the components of an exemplary decryption/decompressing device shown in FIG. 1.

Referring now to FIG. 5, there is illustrated a block diagram of an exemplary decryption/decompressing device 30. The decryption/decompressing device 30 may be connected to the PC/Workstation 20 and removable media 28 via e.g., a universal serial bus (USB) connection, parallel port or serial port to receive the protected electronic data from the PC/Workstation 20 and may output analog audio and video signals via analog communications lines 42 to an external analog input device 44, such as a stereo amplifier, television, video cassette recorder or sound card. The decryption/decompressing device 30 includes a USB/parallel/serial port controller 34, an ASIC/controller 36, a digital to analog converter 38, and RAM 39. The USB/parallel/serial port controller 34 interfaces with the USB/parallel/serial port of the PC/workstation 20 via lines 32 to provide communications between the decryption/decompressing device 30 and PC/workstation 20. The USB/parallel/serial port controller 34 also provides for communication of data between the PC/workstation 20 and the ASIC/controller 36. The ASIC/controller 36 may decrypt the protected data and output digital audio_and/or video signals (e.g., Pulse Code Modulation (PCM)) to the digital to analog converter 38 for conversion to analog audio signals.

Alternatively, the decryption/decompressing device 30 may be provided as a card which is installed within the PC/workstation 20. Such a decryption/decompressing device 30 may communicate to the PC/workstation 20 via the internal bus (e.g., ISA, PCI or AGP) of the PC/workstation 20 instead of via the USB/parallel/serial port. Further, the decryption/decompressing device 30 in this alternative configuration would be provided with an interface to enable communications with the internal bus of the PC 20.

It is noted that the exemplary environment and devices shown in FIGS. 1-5 are not limited to the illustrated environment, as other network infrastructures, communications connectivities, and devices are intended to be within the scope and spirit of the present invention.

Figure 6:
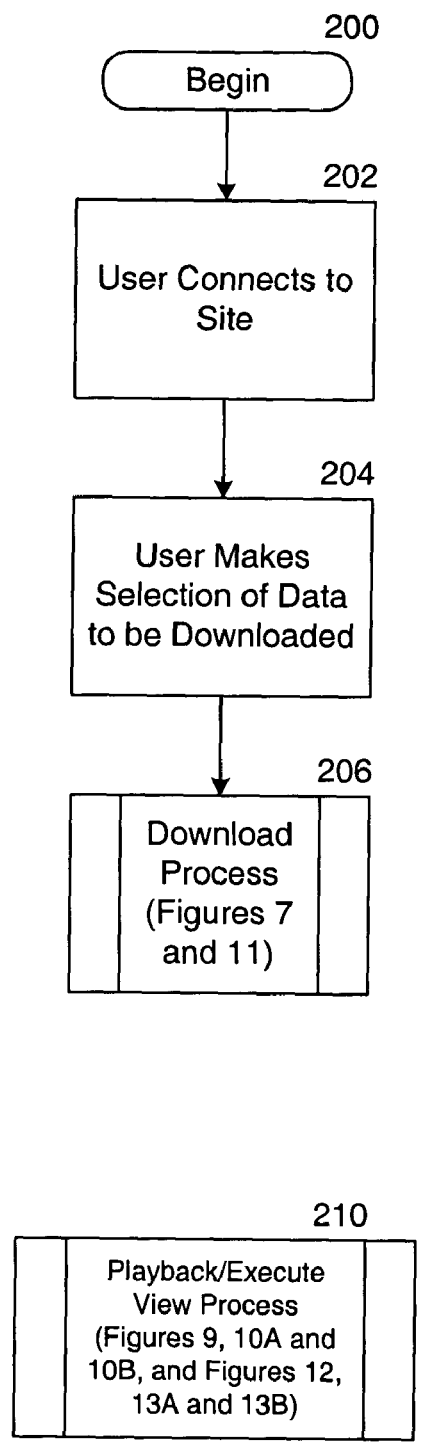
FIG. 6 is a flow chart illustrating an overview of the processes performed in the electronic distribution of data in accordance with the present invention.

Referring now to FIG. 6, there is shown an overview of the processes performed in accordance with the electronic distribution model of the present invention. As will become evident to those of skill in the art, the features and aspects of the present invention may be implemented by any suitable combination of hardware, software and/or firmware. In accordance with the present invention, the network server or servers 16 (FIG. 1) may store data, such as application software, database tables, music, video, etc. for distribution to a client PC 20 and/or stand-alone devices 22. The present invention, while applicable to all types of data transfer, is especially applicable to commerce over the Internet, and in particular, to electronic distribution and delivery of software, music and video data.

The user initiates the electronic data distribution process at step 200 when he or she desires to purchase software, music or videos (i.e., protected electronic data) using a home personal computer 20 or stand alone device 22. The protected electronic data may be offered for sale for a fee from e.g., a World Wide Web (WWW) site residing on one of servers 16, and purchased using a credit card, debit card, smart card, virtual cash, etc. To this end, the home user may connect (step 202), via an Internet browser such as Internet Explorer available from Microsoft, Redmond, Wash., to the WWW site by entering the universal resource locator (URL) or "clicking" a hyper-text link that contains the WWW site's URL. The URL may contain, e.g., an Internet Protocol (IP) address (e.g., 147.178.20.151) or a domain name (e.g., "sitename.com") that identifies the IP address of the site such that the browser may establish a TCP/IP connection. Once connected, the user makes a selection of protected electronic data to be downloaded to his or her PC 20 (shown in FIG. 1)(step 204 in FIG. 6) and the WWW server starts the download process (step 206) in conjunction with helper applications-running on the client PC/workstation 20 using well known protocols (e.g., HTTP).

In accordance with the present invention, the downloaded protected electronic data is encrypted during the download process using a unique identifier (e.g., serial number) of the media 28 as an encryption key and downloaded directly to media 28. In order to ensure that each particular piece of media 28 (FIG. 1) has a unique identifier, wherein the unique identifier is permanently embedded on the media 28 during the manufacturing process and is not accessible by a user or a disk drive that reads/writes to the media 28 at a later time. Further, a user format of the media 28 will not erase or alter the embedded serial number. The downloaded encrypted protected electronic data is then associated to the media 28 by the unique identifier and may not be accessed from any other media having a different or no unique identifier. As will be described below, upon playback/execution/viewing of the protected electronic data in a PC 20, stand alone device 22, or decryption/decompressing device 30 (FIG. 1)(step 210 in FIG. 6), the data is decrypted using the unique identifier of the media 28 as a decryption key and subsequently made available to the PC 20, stand alone device 22 or decryption/decompressing device 30. Thus, any protected electronic data that is copied from the destination media 28 to other storage devices will be unusable, as the other storage devices will not have the same unique identifier as the destination media 28. Such a system would prevent unauthorized copying of the protected electronic data, protecting the intellectual property rights of the seller or owner of such rights.

Figure 7:
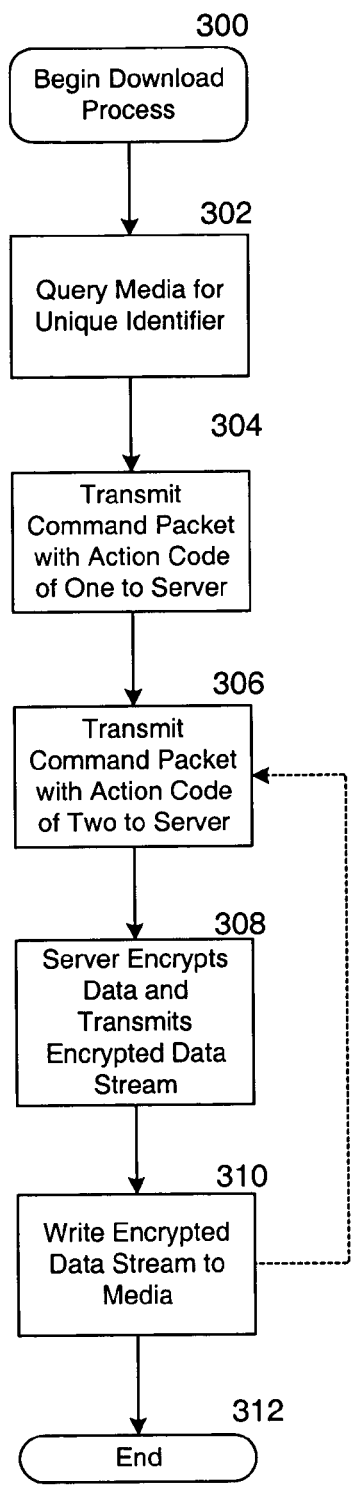
FIG. 7 is a flow chart of the processes performed during a communications session between a client and a server to request and download data in accordance with a first embodiment of the present invention.

A first embodiment implementing the overview processes illustrated in FIG. 6 will now be described in greater detail with reference to FIGS. 7-10. FIG. 7 illustrates the download process of electronically distributing data over the network 12 from a server 16 to a client PC/workstation 20 or stand alone device 22 (FIG. 1) As noted above, the protected electronic data will be downloaded to a particular piece of media having a unique serial number so that the data will be associated with the particular media and accessible from only the particular media.

At step 300 the process begins after a user on the client PC 20 has contacted and connected to a server 16 (Web server) via, e.g., a Web browser, and makes a selection of protected data for downloading. It is preferable, that the Web sever 16 comprises an Iomega store web server 16, which will be described below. It is also preferable that the connection to the Web server is a secure (i.e., encrypted) connection. After the user clicks on the download button of the displayed web page from the Web server, this action causes the PC/workstation to submit an HTML form to the web server 16. The web server 16 then executes the appropriate Common Gateway Interface (CGI) program. The CGI program running on the Iomega store web server 16 sends the metatag "Content-Type: application/x-itf" followed by an appropriate Iomega Transaction File (ITF) to the client PC/workstation20. The ITF file is unique to the Iomega store web server 16 and is used to provide information to an ITF client program which controls the download process at the client side. The format of the ITF file is shown in FIG. 8. As the web browser receives the metatag, it launches the ITF client program and passes the ITF file name as a command line parameter. The ITF client application opens the ITF file and parses the metadata from the metatags. The client PC/workstation 20 connects to the server address provide by the ITFSERVER tag to receive the electronic data (see step 308). The server address may be dynamically changed for each request in order to balance the load on the server. For example, the ITF file may include the following information for a transfer of a single file containing a song:

```
<ITF VERS ION: >0.1
<ITFNEWFILE:>
<ITFID:>2
<ITFSERVER:>147.178.20.151
<ITFFILENAME:>D:\WebSite\htdocs\html\ZipMan\Samples\
SuppReady.mp3
<ITFARTIST:>Genesis.
<ITFTITLE:>Supper's Ready
<ITFALBUM:>Foxtrot
<ITFCOST:>$2.50
<ITFDATE:>Mar. 4, 1998
<ITFSIZE:>4746500.
```

At step 302 the client PC 20 queries the particular piece of media 28 to which the downloaded content is to be stored for the media's unique serial number. By way of a non-limiting example, the media 28 may comprise a ZIP* disk manufactured by Iomega Corporation, Roy, Utah. Each Iomega ZIP" disk contains a unique serial number that is written to a predetermined track during the formatting process which may be used as the unique identifier. The serial number is preferably created by but not limited to a pseudo random number generator. Further, while the media 28 has been described in terns of a ZIP® disk, it is not limited to the ZIP* disk, as the use of other removable and permanent media types having a unique identifier is within the scope and spirit of the present invention such as CD-R, DVD-RAM, and other removable floppy and hard disks.

The client PC 20 may query the media using an application programming interface (API) such as the Iomega Ready API, or other suitable method. The Iomega Ready API when invoked causes the media drive to read the unique serial number from the predetermined track by using the SCSI 0x06 Non-Sense Command. In particular, by invoking the Disk Status Page (page 0x02) of the Non-Sense Command, the media serial number may be determined by reading offset bytes 20-59 of the returned data structure. Exemplary source code for performing step 302 in conjunction with an Iomega ZIP® drive and disk is as follows:

```
void CClientApp::GetZipDrive( )
{
    int j,k;
    m_DriveNum = 0;
    for(j = 0;j < 26;j++)
        // scan the drives and find the IOMEGA drives
    {
        if(IsIomegaDrive(j) )
        {
            k = GetGeneralDevType(j);
            if( k =-- DRIVE-IS-ZIP
            m_DriveNum = j;
            j = 26;
        }
    }
}
void CClientApp::GetSerialNumber( )
{
    unsigned char szBuffer[1024];
    memset(szBuffer,0,sizeof(szBuffer));
    memset(&m SerialNumber,0,40);
    GetInfoNonSense(m DriveNum,Ox02,szBuffer);
    memcpy(&m SerialNumber,&szBuffer[22],39);
}
```

It can be appreciated that the unique identifier is not limited to information stored on the media 28 such as the serial number, and that other types of information could be used as the unique identifier, so long as it is permanently stored on the media 28. In addition, the unique serial number should contain a sufficient number of bits (length) to ensure that no two pieces of media have the same identifier. For example, each Iomega ZIP'40 disk contains a unique 39 byte (312 bits) serial number, and other bit lengths may be utilized.

Once the client PC 20 is connected to the server 16 identified in the ITFSERVER tag (e.g., 147.178.20.151), the client sends a command packet to the server via TCP/IP sockets at step 304. The first command packet has an action code of one and contains the file name to be transferred, all the customer information, billing information, and the unique serial number of the media. The first command packet may be formatted as follows:

```
struct SocketCommand
}
    unsigned long Code;
    unsigned long Size;
    unsigned char Data[400];
};
```

The server responds with a data packet with the same action code and informs the client that the file has been opened and the file size.

Alternatively, the Data field may comprise a plurality of fields containing the customer information, billing information, and the unique serial number as parsed fields. The data field may be formatted to have the following data structure:

```
{
    char First[20];
    char Last[20];
    char Address[40];
    char City[20];
    char State[3];
    char Zip[6];
    char CreditCard[17];
    char ExpDate[5];
    char Phone[13];
    char Serial[40];
    long int DataID;
};
```

At steps 306-310 the client sends a command packet with an action code of two (step 306), which informs the server to send the next 4000 bytes of data encrypted the unique serial number. This action code is repeated until the entire file has been transferred from the server 16 to the client PC 20. The server 16 encrypts the data key for the digital content to be downloaded using the unique serial number (and any additional information) as an encryption key (step 308). While any suitable encryption algorithm may be utilized at step 308, the data encryption is preferably performed using the well known Blowfish encryption algorithm. The Blowfish encryption algorithm is advantageously fast, especially when implemented on 32-bit microprocessors with large data caches, such as the Intel Pentium and the IBM/Motorola PowerPC. Briefly, Blowfish is a variable-length key, 64-bit block cipher which may be implemented in either hardware or software. The algorithm consists of two parts: a key-expansion part and a data-encryption part. The key expansion part converts a key of at most 448 bits into several subkey arrays totaling 4168 bytes. The data encryption occur: via a 16-round Feistel network, wherein each round consists of a key-dependent permutation and a key- and data-dependent substitution. All operations are exclusive ORs (XOR) and additions on 32-bit words. The only additional operations are four indexed array data lookups per round to generate the encrypted data.

Also at step 308, the server transmits the data to the client, via, e.g., TCP/IP sockets, and the client PC 20 writes the data to the media 28 at step 310. The data may be 5 written to the media 28 in a standard file system structure or by direct track or sector writes. The format by which the data is written to the media 28 is not limited to the noted formats, as other formats may be utilized. The data transmitted to the client PC 20 from the server 20 is preferably in a predetermined data structure such as the following:

```
struct SocketData
{
    unsigned int Code;
    unsigned long FileSize;
    unsigned char Data[4000];
};
```

The process of step 306-310 repeats until all of the data has been downloaded from the server 16 to the client PC 20. At that time the client PC 20 will send an action code of three to inform the server 16 that the transaction is complete and to disconnect the socket (step 312). It is noted that the source code and data structures above are included herein for exemplary purposes only, and are in no way intended to limit the scope of the present invention.

Figure 9:
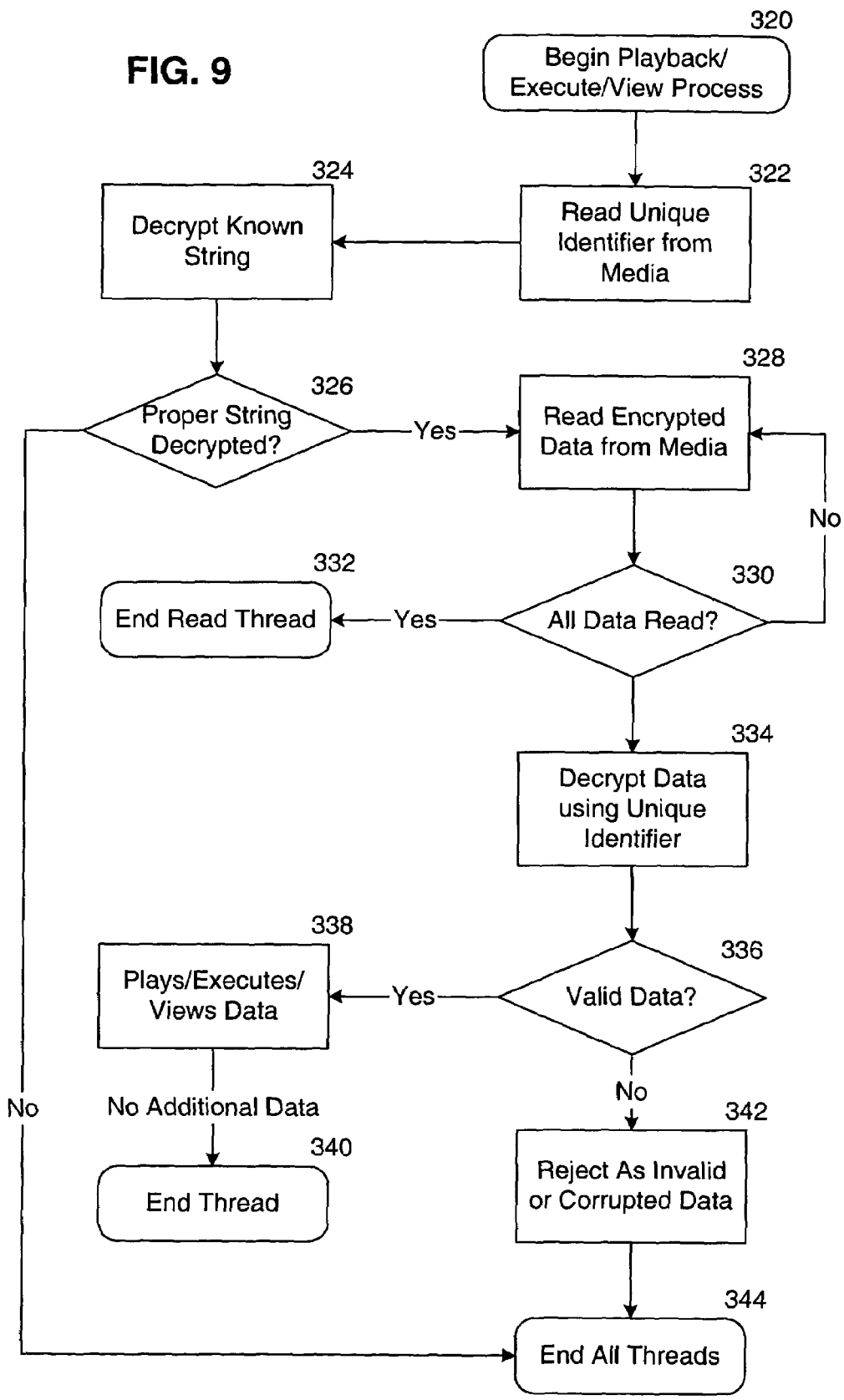
FIG. 9 is a flow chart of the processes performed by PC/Workstation or stand-alone machine during the reading/execution/playback of the protected data in 5 accordance with the first embodiment of the present invention.

Referring now to FIG. 9, there is illustrated the processes performed during a reading/execution/playback of the protected data once it has been written to the media 28 in accordance with an first hardware implementation of the first embodiment. As will be appreciated by those of skill in the art, the process of FIG. 9 may be executed in multiple threads to increase the performance of the playback/execution/viewing process. As will be described below, the protected data is decrypted using the unique serial number of the media 28 as a decryption key in order to present the PC 20 or stand alone device 22 with usable electronic data.

The playback/execution/viewing process begins at step 320 when the user places the media 28 within the PC 20 or stand alone device 22 and accesses the protected electronic data on the media 28. The user may access the protected data using a combination of software and hardware installed on the PC 20 or stand alone device 22.

At step 322 the PC 20 (or stand alone device 22) reads the unique serial number from the media 28 and stores the unique serial number in RAM 64 (RAM 39). As noted above, the media is preferably the Iomega ZIP® disk which contains the unique serial number on a predetermined track of each ZIP® disk; however, the media is not limited to the ZIP® disk and may comprise any media having a unique serial number or identifier; as described above. Also as noted above, the PC 20 software may utilize the Iomega Ready API to read the serial number at step 322 from the disk.

At step 324 the PC 20 (or stand alone device 22) decrypts a predetermined string contained on the media 28 using the unique serial number. The predetermined string is compared to a known string at step 326 to determine if a proper string is decrypted (i.e.; the decrypted predetermined string equals the known string). If the predetermined string has been decrypted into the known string, the process continues at step 328 where the encrypted protected electronic data is read from the media 28. Otherwise, if the result of the decryption of the predetermined string was not the known string, then all threads end, stopping the playback/execute/viewing process at step 344.

At step 328 the PC 20 (or stand alone device 22) reads the encrypted data from the media 28 and temporarily stores the protected electronic data in RAM 64 (RAM 39). The reading process may be performed within a first thread running on the PC 20, and is performed in a manner analogous to writing the data to the media 28, e.g., via standard file system reads, or direct track or sector reads. The format by which the data is read from the media 28 is performed in accordance with the manner the data was written to the media, and, as in writing the data to the media 28 is not limited to the above-noted formats, as other formats may be utilized.

At step 330 it is determined if all of the protected data has been read from the media 28. If so, the read thread is ended at step 332. Otherwise, if there is additional data to be read, the read thread returns to step 328 to read additional protected data from the media 28. In accordance with an aspect of the invention, the entirety of the protected content need not be read from the media 28 at step 328, which reduces the amount of memory required to implement the decryption process. Also, because the processes of FIG. 9 are executed it a multi-threaded fashion, the process of reading the protected data from the media 28 maybe performed as other portions of the protected data are decrypted in a second thread or other hardware, as discussed below.

Also from step 330 a second thread decrypts the protected data (step 334) using the unique serial number of the media 28 (read at step 322) as a decryption key. The decryption of the data at step 334 is performed in accordance with the encryption algorithm and preferably comprises the Blowfish algorithm, as noted above. The decryption may occur in software, or may be performed in hardware if a higher level of security is required. Further as noted above, because the decryption runs in a second thread (or other hardware device), the decryption process may be performed simultaneously with the reading process at step 328.

At step 336 the decrypted data is verified to determine if it is valid data (i.e. usable). If the data is valid, the data is then executed/played/viewed by the PC 20 (or stand alone device 22) at step 338. The process of executing/playing/viewing may be performer in a third thread or other hardware device (e.g., sound card). If, however, the data is not valid or is corrupted at step 336, the process notifies the user at step 342 and ends all threads at step 344. Once all of the protected data is decrypted and played/viewed/executed, all thread comprising the processes of FIG. 9 are ended at step 344. It is preferable to delete all temporary files containing unencrypted protected electronic data upon completion of the process at step 344 in order to further enhance the anti-piracy features of the present invention.

Thus, by implementing the processes of FIG. 9 in multiple threads, the processes of reading, decrypting and executing/playing/viewing the protected data may occur simultaneously in the PC 20 to increase performance.

It is noted that the PC/workstation 20 and stand alone device 22 have been described above as performing steps 320-344 in a similar fashion. However, because the PC/workstation 20 comprises a general purpose computer, there may be additional feature of the present invention provided within the PC/workstation 20, which will be describes below.

For example, when executing/playing/viewing the protected data on the PC/workstation 20, the software or hardware decryption process at steps 334 through 338 may be performed such that the protected electronic data is decrypted and an executable program is automatically launched to utilize the decrypted protected electronic data. Alternatively, the software or hardware decryption process may decrypt and validate the protected electronic data at steps 334 and 336 and store the decrypted data temporarily on the media 28, other media (e.g., hard disk 76) or in memory (e.g., RAM 64) for execution or use by other software or hardware applications at step 338. This alternative allows the user to play/execute/view the protected electronic data at a time after decrypting. In addition, if enhanced security preferred, the protected electronic data could be stored in an encrypted form in RAM 64 a step 328 and temporarily decrypted at step 334 on an as-needed basis.

As noted above, the decryption process at step 334 (FIG. 9) may be implemented in software or hardware. An exemplary first hardware implementation will be described with reference to FIGS. 2-4. As is well known in the art, an ASIC is a custom of semi-custom integrated circuit that may be designed to perform a variety of functions. Accordingly, the ASICs 108 and/or 36 may be designed to perform the decryption of step 334 in addition to the other functions performed by ASICs 108 and 36 noted above. It is preferable to implement the decryption process in the ASIC 108 and/or 36 to minimize the likelihood of unscrupulous pirates "hacking" the decryption software for the purpose of making illegal copies of the protected electronic data.

In the first hardware implementation, the entirety of steps 320-344 of FIG. 9 are performed within a single device (e.g., PC/workstation 20 or stand alone device 22). When the first hardware implementation is implemented in PC 20, the encrypted data read from the media 28 is passed to the ASIC 108 (via the controller 68) for decryption (at steps 324 and 334) using the unique serial number of the media 28 as the decryption key. Once the protected electronic data is decrypted by ASIC 108, it is then passed back (via controller 68) to the PC 20 for validation and execution. By incorporating the decryption processing into the ASIC 108, the burden on the processor 66 will be advantageously reduced, speeding up any other operations being performed by the PC/workstation 20.

When the first hardware implementation is implemented in the stand alone device 22, the encrypted data is passed to the ASIC/controller 36 (via the controller 68 and the CPU 66) for decryption at steps 324 and 334 using the unique serial number of the media 28 as the decryption key. Once the protected electronic data is decrypted and validated by ASIC/controller 36, it is converted to digital audio and/or video data passed to the digital to analog converter 38 for conversion to analog audio and video information. The analog information is then output to an analog input device 44, such as a VCR, tape deck, amplifier 5 sound card, etc., and the process ends at step 336.

A second hardware implementation of the first embodiment will now be described, which distributes the processing between the PC/workstation 20 and the decryption/decompressing device 30 described with reference to FIG. 5. The decryption/decompressing device 30 may operate, for example, as a special purpose media player attached to the PC 20. The decryption/decompressing device 30 is provided with the capability of receiving the protected electronic data from the PC 20, decrypting and decompressing (if necessary) the content, and providing audio and/or video outputs.

Figure 10A:
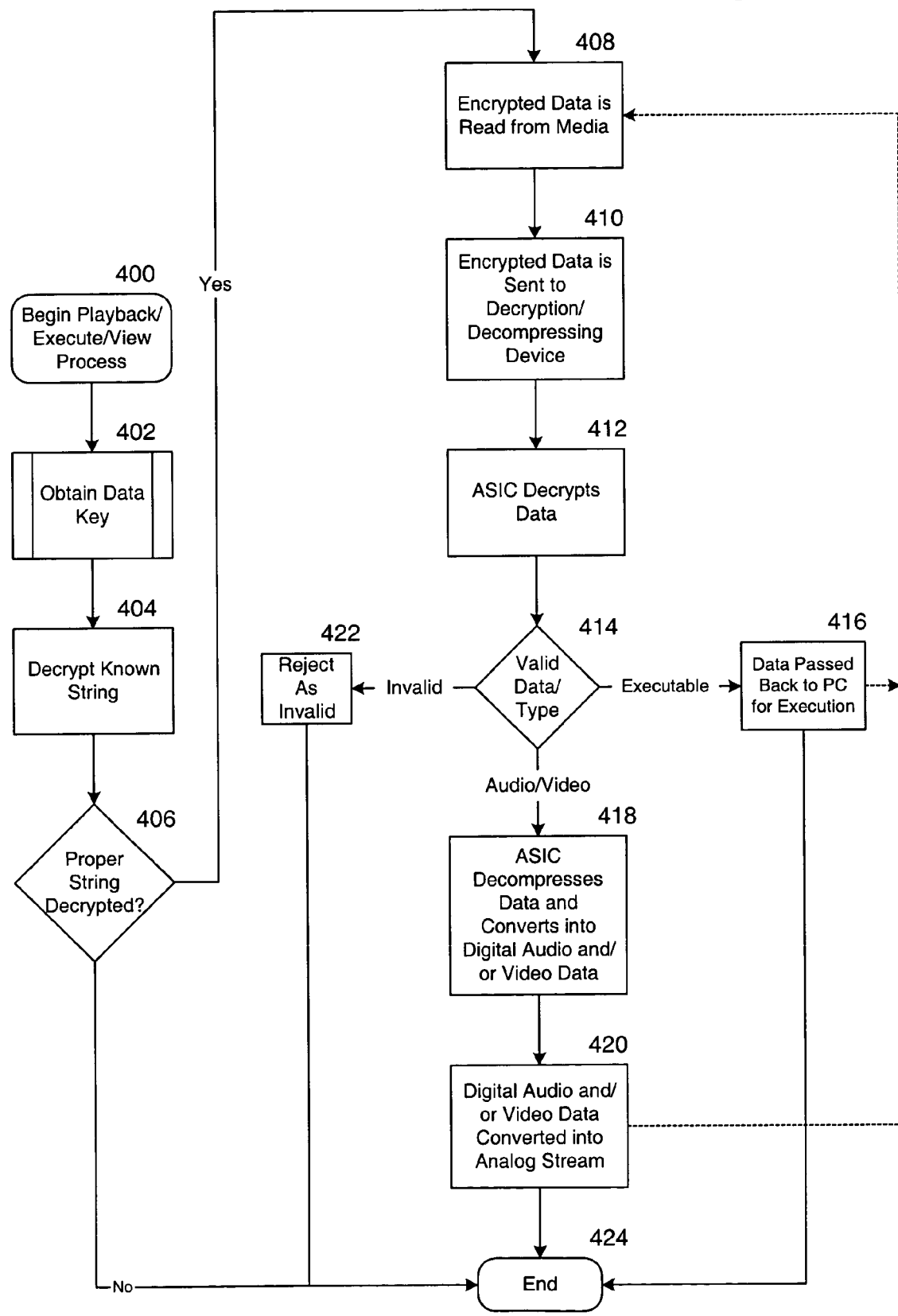
FIGS. 10A and 10B are flow charts of the processes performed by the decryption/decompressing device during the read/playback of data in accordance with the first embodiment of the present invention.

The operation of the second hardware implementation of the first embodiment will be described with reference to FIGS. 10A and 10B. The process begins at step 400 when the user places the media 28 within the PC 20 and accesses the protected electronic date on the media 28. At step 402 the data key (i.e., unique serial number) to the protected date is obtained. The processes of step 402 are describe in detail with reference to FIG. 10B.

Figure 10B:
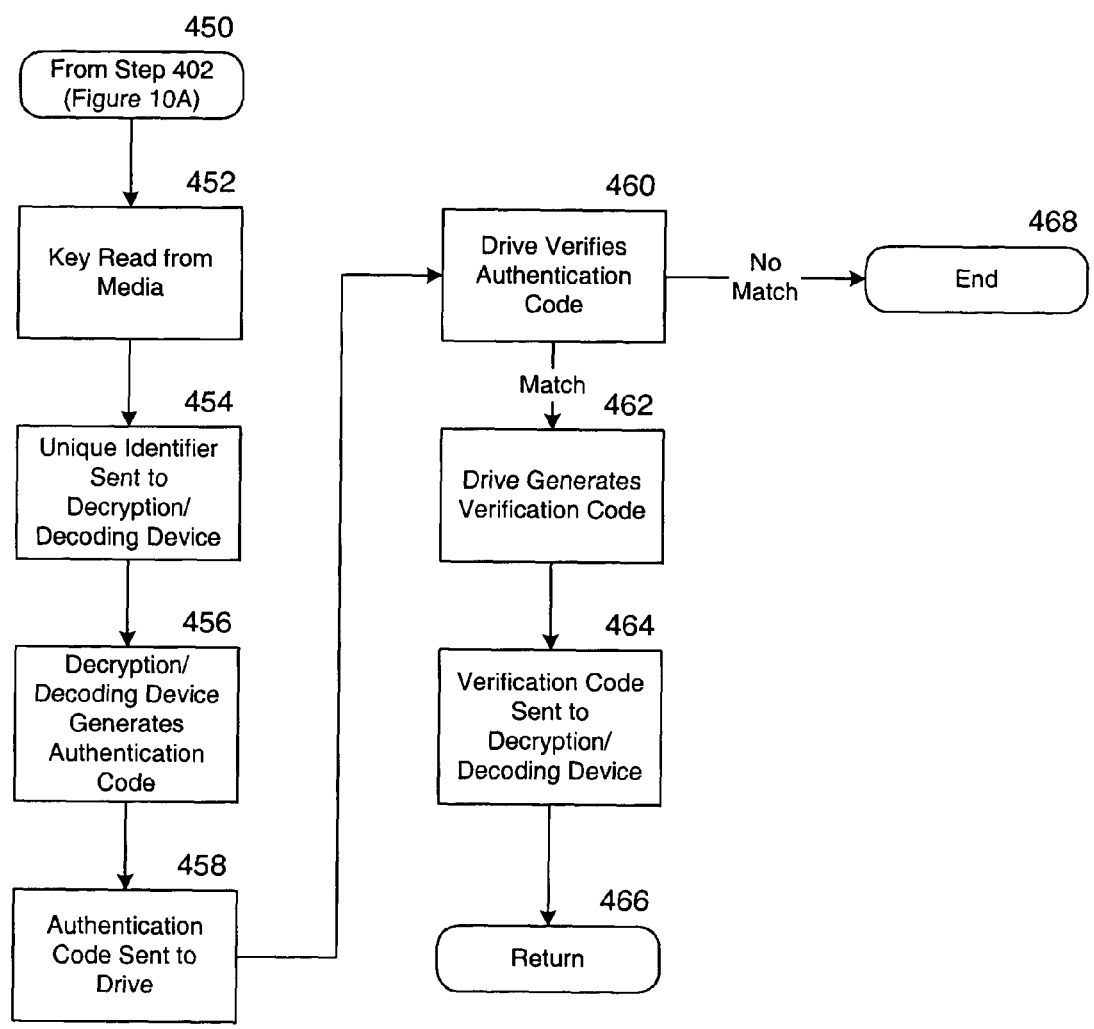

Referring now to FIG. 10B (step 450), processing begins at step 452 when the PC 20 reads the unique serial number from the media 28 and passes it to the decryption/decoding device 30 at step 454. As noted above, the media 28 is preferably the Iomega ZIP® disk which contains the unique serial number on a predetermined track of each ZIP® disk; however, the media is not limited to the ZIP, disk and may comprise any media having an associated unique serial number. The PC 20 software may utilize the Iomega Read API to read the serial number from the disk, as noted above. At step 456 the decryption/decoding device 30 generates an authentication code, which is passed back to the PC 20 (media drive 52) at step 458. At step 460 the media drive 52 verifies that the authentication code passed from the decryption/decoding device 30 is the same as the unique serial number on the media 28 actually in the drive 52. If the authentication code does not correspond to the unique serial number, then the playback/execution/viewing process stops at 468. If the authentication code matches the unique serial number, then at step 462, the media drive 52 generates a verification code. The verification code is sent to the decryption/decoding device 30 at step 464 and the process returns as indicated at 466 to step 404 in FIG. 10A. The two-step verification process of FIG. 10B ensures that the unique serial number of the media 28 physically in the media drive 52 has the same unique serial number sent to the decryption/decoding device 30 at step 454 and further enhances the present invention's resistance to hacking. The unique serial number is stored in RAM 39 for use as the decryption key in the decryption process (steps 406 and 412).

Referring again to FIG. 10A, at step 404 the decryption/decoding device 30 decrypts a predetermined string contained on the media 28 using the unique serial number. The predetermined string is sent to the decryption/decoding device 30 via the USB/parallel/serial port 58. The predetermined string is compared to a known string by the decryption/decoding device 30 at step 406 to determine if a proper string is decrypted (i.e., the decrypted string equals the known string). If the decrypted predetermined string equals the known string, the process continues at step 408 where the encrypted data is read from the media 28. Otherwise, if the decrypted predetermined string does not equal the known string, then the process ends at step 424.

At step 408, the encrypted data is read from the media 28 and sent via USB/parallel/serial port 58 to the decryption/decompressing device 30 at step 410. At step 412, the ASIC/controller 36 decrypts the protected electronic data received by controller 34. The decryption process is performed as noted above with reference to step 334 (FIG. 9). As the protected electronic data is decrypted, the ASIC/controller 36 (or application software running on the PC 20) determines at step 414 the type of information that comprises the protected electronic data and if the decrypted data is valid. If the data is determined to be invalid at step 414, the user may be notified at step 422 and the process ends at step 424.

If at step 414 the protected electronic data is valid application software or a valid executable file, the decryption/decompressing device 30 may pass the decrypted file back to the PC 20 for execution at step 416. As illustrated in FIG. 10A, the process of sending encrypted data to the decryption/decoding device 30 may loop through steps 408 through 416 until all of the data is read from the media 28 and passed back to the PC 20 for execution. After the all of the protected electronic data has been decrypted and passed back to the PC 20, the process ends at step 424.

If the protected electronic data is valid audio or video data, the decryption/decompressing device 30 may additionally provide for decompression of the audio or video data at step 418 in ASIC/controller 36. Typically, digital audio and video information is compressed according to standard compression algorithms. For example, full-motion video and audio information may be compressed using the Moving Pictures Expert Group (MPEG) standard and still pictures may be compressed using the Joint Picture Expert Group (JPEG) standard. The decompressed audio or video information may be converted to digital data (e.g., pulse code modulation (PCM)) at step 418 and sent to the digital to analog converter 38.

At step 420 the digital audio or video data is converted to analog audio or video signals by the digital to analog converter 38. The analog signals are output to an analog input device 44 (e.g., stereo amplifier, video cassette recorder, sound card or television) for playback/viewing. As illustrated in FIG. 10A, the process of sending encrypted data to the decryption/decoding device 30 may loop through steps 408 through 420 until all of the data is read from the media 28. After all of the protected electronic data has been converted to an analog output, the process ends at step 424.

In accordance with the second hardware implementation, the protected data maybe streamed from the PC 20 to the decryption/decompressing device 30, or alternatively, download to the RAM 39 in its entirety prior to decryption by the ASIC/controller 36.

A second embodiment implementing the overview processes illustrated in FIG. 6 will now be described in greater detail with reference to FIGS. 11-13. The second embodiment provides for additional security by including not only the unique identifier in the encryption/decryption key, but also a vendor identifier and a user identifier. Such an encryption/decryption key will be referred to herein as a compound key. In particular, by using the compound key having vendor information and user information, certain additional safeguards may be built into the distribution of the protected data. The vendor information may be an identifier created by the vendor of the protected content or an industry group. The purpose of this identifier is to allow the vendor or an industry group to add additional layers of security to prevent unauthorized decryption of protected data by a person or software program not approved by the vendor or industry group. For example, as will be discussed below, the vendor information may be retrieved from application software downloading, running or playing the protected content, thus further restricting use of the content to devices having licensed copies of the application software. Alternatively, the vendor information may retrieved from a server located on a local area network (LAN), wide area network (WAN), or the Internet, etc.

The user information is information that is specific to an individual user or group of users. This identifier may be created by the user or on the user's behalf by the software application. The user identification provides for user control over access to the protected content. Such user control may be desirable in corporate environments to allow only authorized users (e.g., company officers, specific departments and specific individuals) access the protected content. In the home, user control will provide parents with a mechanism by which to prevent children from accessing inappropriate content (e.g., R-rated movies).

Figure 11:
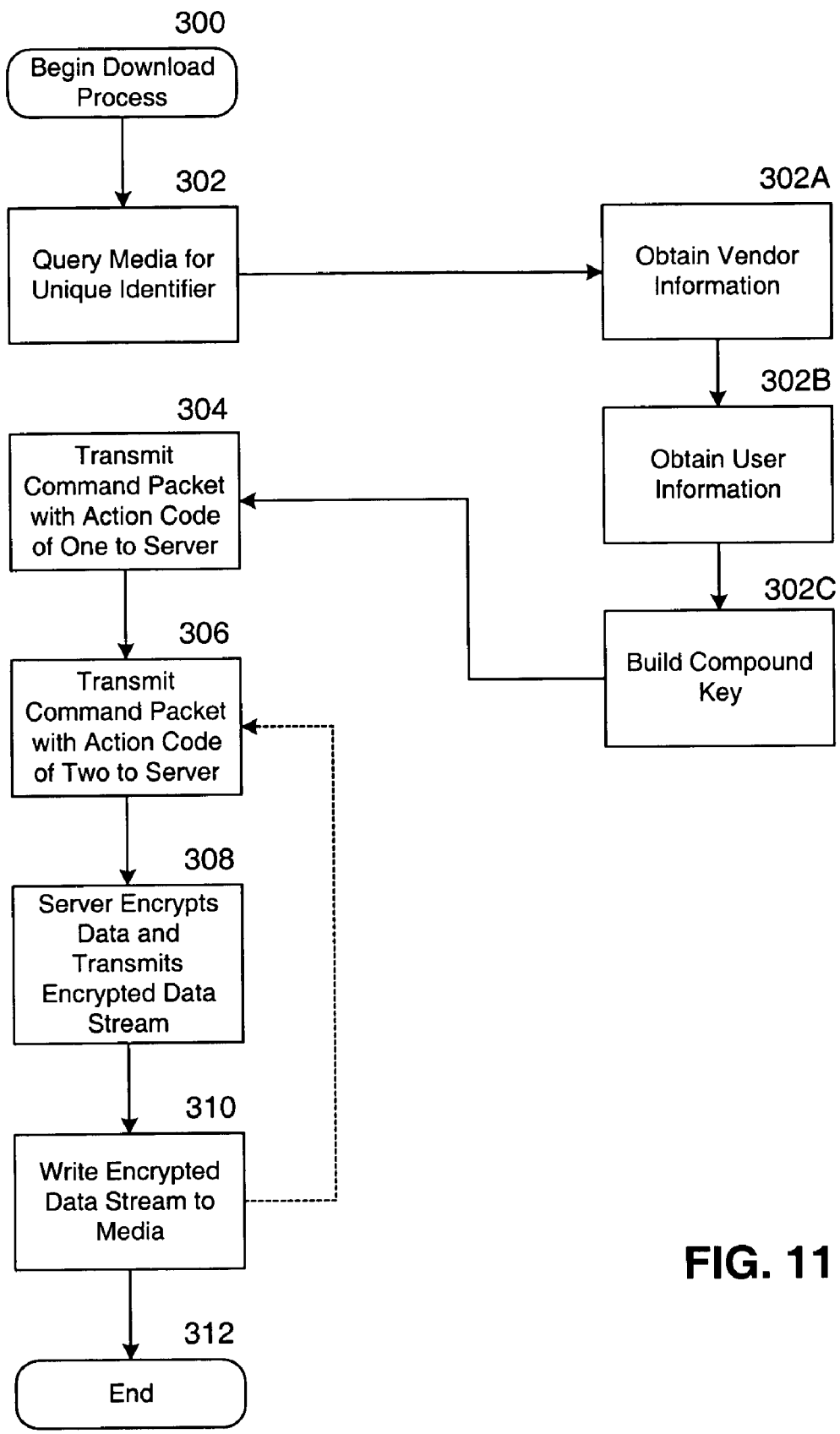
FIG. 11 is a flow chart of the processes performed during a communications session between a client and a server to request and download data in accordance with a second embodiment of the present invention.

Referring now to FIG. 11, there is illustrated the download process of electronically distributing data over the network 12 from a server 16 to a client PC/workstation 20 or stand alone device 22 in accordance with the second embodiment. As noted above, the protected electronic data will be downloaded to a particular piece of media having a unique identifier so that the data will not only be associated with the particular media and accessible from only the particular media, but will also include vender and user information as part of the encryption/decryption key for added security. Further, in FIGS. 11-13, all steps having similar processes as those discussed with respect to FIGS. 7 and 9-10 are similarly numbered and the detailed description of such steps will not be repeated herein below.

At step 300, the process begins after a user on the client PC 20 has contacted and connected to a server 16 (Web server) via, e.g., a Web browser, and makes a selection of protected data for downloading. At step 302 the client PC 20 queries the particular piece of media 28 to which the downloaded content is to be stored for the media's unique serial number.

At step 302A, the vendor information is obtained. Such information may be embedded by known means within the ITF client program which controls the download process at the client side. As such, each vendor would have a unique ITF client program to perform the download process. Alternatively, a generic ITF client program may be executed at the client side and the vendor information retrieved from a file on the client PC 20, stand alone device 22, or from a database on the server 16 that associates the protected content to the vendor information via known processes.

At step 302B, the user information is obtained. This is preferably performed by prompting the user for the information. The user then enters the information, which is temporarily stored in RAM 64 or on the hard disk 76. Alternatively, a separate software application may be invoked to provide the user information (e.g., a password application that retrieves a user's password from a network yellow pages file).

At step 302C, the compound encryption/decryption key is built. The process may be performed by combining the three key components (e.g., the unique identifier of the media 28, the vendor information, and the user information) by any means, including but not limited to, mathematical operations (mod, addition, division, subtraction, XOR, etc.) concatenation, interleaving, or any other method. Preferably, byte level interleaving of the vendor information and the user information is performed. This results in a string having the structure: V0U0V1U1V2U2V3U3V4U4V5U5V6U6V7U vendor information byte x, and Ux is user information byte x. The resulting string is then combined with the unique serial number by an XOR (exclusive OR) operation to form the compound key. Thus, the compound key is preferably created as follows:

$$CK = S \text{ XOR } (V \text{ interleaved } U)$$

wherein,
CK=Compound Key
S=Serial Number
V=Vendor Information
U=User Information Once the client PL 20 is connected to the server 16, the client sends a command packet to the server via TCP/IP sockets at step 304. The server responds with a data packet with the same action code and informs the client that the file has been opened and the file size. At steps 306-310 the client sends a command packet with an action code of two (step 306), which informs the server to send the data encrypted by the compound key. This action code is repeated until the entire file has been transferred from the server 16 to the client PC 20. The server 16 encrypts the data key for the digital content to be downloaded using the compound key (and any additional information) as an encryption key (step 308). Also at step 308, the server transmits the data to the client, via, e.g., TCP/IP sockets, and the client PC 20 writes the data to the media 28 at step 310. As noted above, the process of step 306-310 repeats until all of the data has been downloaded from the server 16 to the client PC 20. At that time the client PC 20 will send an action code of three to inform the server 16 that the transaction is complete and to disconnect the socket (step 312).

Figure 12:
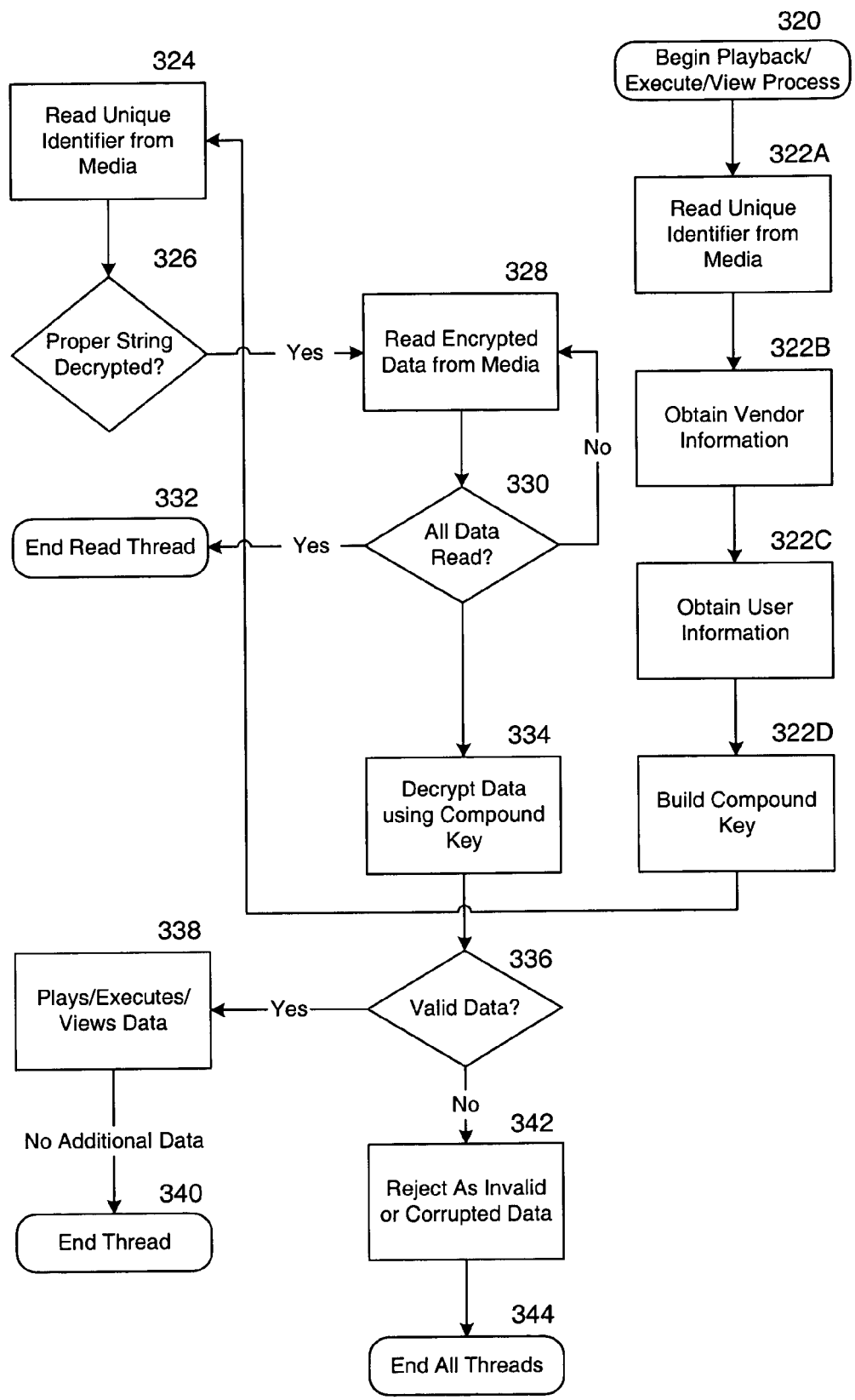
FIG. 12 is a flow chart of the processes performed by PC/Workstation or stand-alone machine during the reading/execution/playback of the protected data in accordance with the second embodiment of the present invention.

Referring now to FIG. 12, there is illustrated the processes performed during a reading/execution/playback of the protected data once it has been written to the media 28 in accordance with a first hardware implementation of the second embodiment.

The playback/execution/viewing process begins at step 320 when the user places the media 28 within the PC 20 or stand alone device 22 and accesses the protected electronic data on the media 28. At step 322A the PC 20 (or stand alone device 22) reads the unique serial number from the media 28 and stores the unique serial number in RAM 64 (RAM 39). At step 322B, the vendor information is obtained. Such information is preferably embedded within the application software which performs the playback/execution/viewing of the protected data. Alternatively, a standardized application may be developed that performs the playback/execution/viewing at the client side and the vendor information retrieved from a file on the client PC 20, stand alone device 22, or from a database on the server 16 that associates the protected content to the vendor information via known processes. At step 322C, the user information is obtained, as noted above with regard to step 302B, and at step 322D, the compound encryption/decryption key is built, as described with regard to step 302C.

At step 324 the PC 20 (or stand alone device 22) decrypts a predetermined string-contained on the media 28 using the compound key. The predetermined string is compared to a known string at step 326 to determine if a proper string is decrypted (i.e., the decrypted predetermined string equals the known string). If the predetermined string has been decrypted into the known string, the process continues at step 328 where the encrypted protected electronic data is read from the media 28. Otherwise, if the result of the decryption of the predetermined string was not the known string, then all threads end, stopping the playback/execute/viewing process at step 344.

At step 328 the PC 20 (or stand alone device 22) reads the encrypted data from 10 the media 28 and temporarily stores the protected electronic data in RAM 64 (RAM 39). At step 330 it is determined if all of the protected data has been read from the media 28. If so, the read thread is ended at step 332. Otherwise, if there is additional data to be read, the read thread returns to step 328 to read additional protected data from the media 28. Also from step 330 a second thread decrypts the protected data (step 334) using the compound key of the media 28 (read at step 322) as a decryption key.

At step 336 the decrypted data is verified to determine if it is valid data (i.e., usable). If the data is valid, the data is then executed/played/viewed by ,the. PC 20 (or stand alone device 22) at step 338 until there is no additional data as indicated at 340. The process of executing/playing/viewing may be performed in a third thread or other hardware device (e.g., sound card). If, however, the data is not valid or is corrupted at step 336, the process notifies the user at step 342 and ends all threads at step 344. Once all of the protected data is decrypted and played/viewed/executed, all threads comprising the processes of FIG. 12 are ended at step 344. It is preferable to delete all temporary files containing unencrypted protected electronic data upon completion of the process at step 344 in order to further enhance the anti-piracy features of the present invention.

A second hardware implementation of the second embodiment will now be described, which distributes the processing between the PC/workstation 20 and the decryption/decompressing device 30 described with reference to FIG. 5. The decryption/decompressing device 30 may operate, for example, as a special purpose media player attached to the PC 20. The decryption/decompressing device 30 is provided with the capability of receiving the protected electronic data from the PC 20, decrypting and decompressing (if necessary) the content, and providing audio and/or video outputs.

The operation of the second hardware implementation of the second embodiment will be described with reference to FIGS. 13A and 13B. The process begins at step 400 when the user places the media 28 within the PC 20 and accesses the protected electronic data on the media 28. At step 402A the media to which the protected data is stored is verified. The processes of step 402A are describe in detail with reference to FIG. 13A.

Figure 13B:
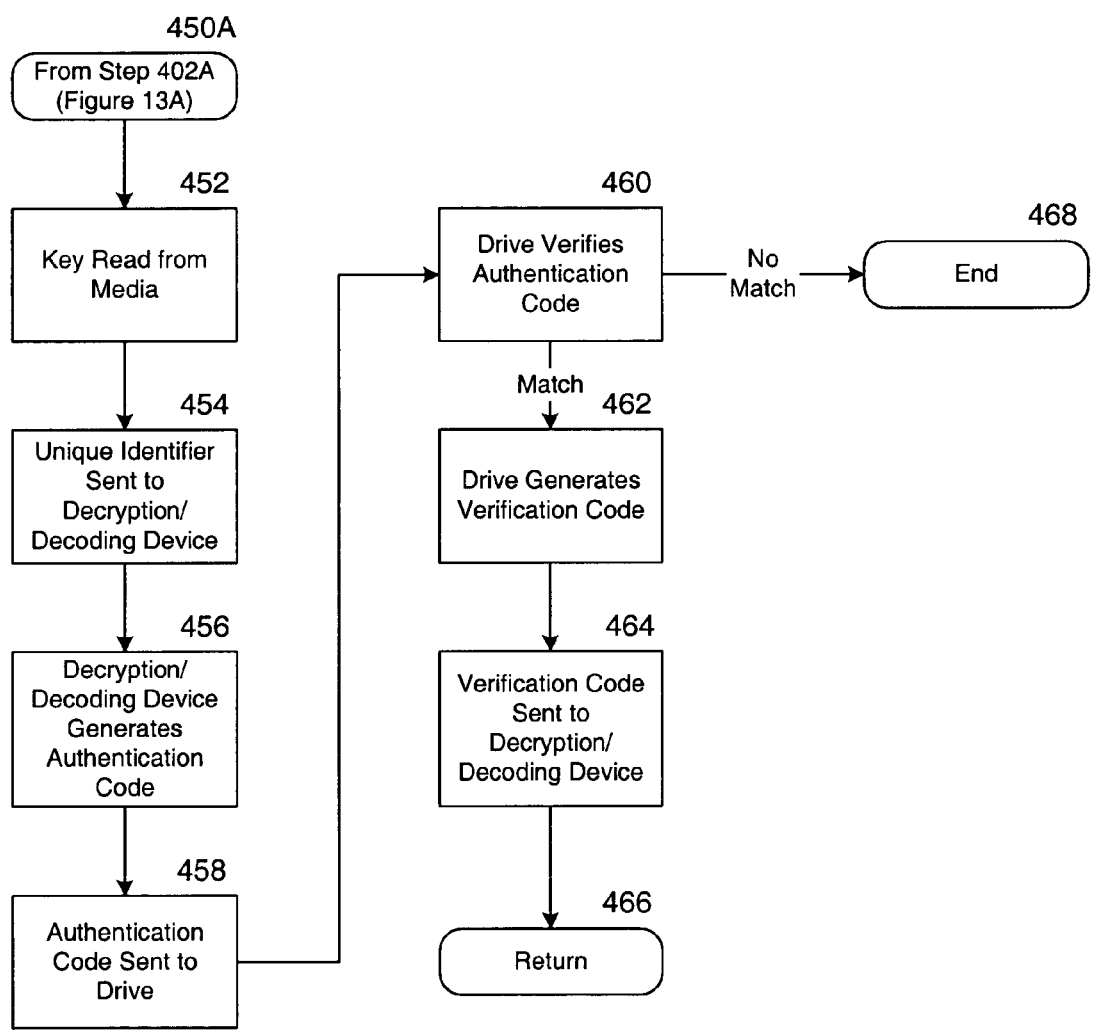

Referring now to FIG. 13B (step 450A), processing begins at step 452 when the PC 20 reads the unique serial number from the media 28 and passes it to the decryption/decoding device 30 at step 454. At step 456 the decryption/ decoding device 30 generates an authentication code, which is passed back to the PC 20 (media drive 52) at step 458. At step 460 the media drive 52 verifies that the authentication code passed from the decryption/decoding device 30 is the same as the unique serial number on the media 28 actually in the drive 52. If the authentication code does not correspond to the unique serial number, then the playback/execution/viewing process stops at 468. If the authentication code matches the unique serial number, then at step 462, the media drive 52 generates a verification code. The verification code is sent to the decryption/decoding device 30 at step 464 and the process returns, as indicated at step 466 to step 404 in FIG. 13A. The two-step verification process of FIG. 10B ensures that the unique serial number of the media 28 physically in the media drive 52 has the same unique serial number sent to the decryption/decoding device 30 at step 454 and further enhances the present invention's resistance to hacking. The unique serial number is stored in RAM 39 for use as part of the compound decryption key in the decryption process (steps 406 and 412).

Referring again to FIG. 13A, at step 402B, the vendor information is obtained. Such information is preferably embedded within the application software which performs the playback/execution/viewing of the protected data. Alternatively, a standardized application may be developed that performs the playback/execution/viewing at the client side and the vendor information retrieved from a file on the client PC 20, stand alone device 22, or from a database on the server 16 that associates the protected content to the vendor information via known processes. At step 402C, the user information is obtained, as noted above with regard to step 302B, and at step 402D, the compound encryption/decryption key is built, as described with regard to step 302C.

At step 404 the decryption/decoding device 30 decrypts a predetermined string contained on the media 28 using the compound key. The predetermined string is sent to the decryption/decoding device 30 via the USB/parallel/serial port 58. The predetermined string is compared to a known string by the decryption/decoding device 30 at step 406 to determine if a proper string is decrypted (i.e., the decrypted string equals the known string). If the decrypted predetermined string equals the known string, the process continues at step 40F where the encrypted data is read from the media 28. Otherwise, if the decrypted predetermined string does not equal the known string, then the process ends at step 424.

At step 408, the encrypted data is read from the media 28 and sent via USB/parallel/serial port 58 to the decryption/decompressing device 30 at step 410. At step 412, the ASIC/controller 36 decrypts the protected electronic data received by controller 34 The decryption process is performed as noted above with reference to step 334 (FIGS. 9 and 12). As the protected electronic data is decrypted, the ASIC/controller 36 (or application software running on the PC 20) determines at step 414 the type of information that comprises the protected electronic data and if the decrypted data is valid. If the data is determined to be invalid at step 414, the user may be notified at step 422 and the process ends at step 424.

If at step 414 the protected electronic data is valid application software or a valid executable file, the decryption/decompressing device 30 may pass the decrypted file back to the PC 20 for execution at step 416. As illustrated in FIG. 10A, the process of sending encrypted data to the decryption/decoding device 30 may loop through steps 408 through 416 until all of the data is read from the media 28 and passed back to the PC 20 for execution. After the all of the protected electronic data has been decrypted and passed back to the PC 20, the process ends at step 424.

If the protected electronic data is valid audio or video data, the decryption/decoding device 30 may additionally provide for decompression of the audio or video data at step 418 in ASIC/controller 36. Typically, digital audio and video information is compressed according to standard compression algorithms. For example, full-motion video and audio information may be compressed using the Moving Pictures Expert Group (NTEG) standard and still pictures may be compressed using the Joint Picture Expert Group (JPEG) standard. The decompressed audio or video information may be converted to digital data (e.g., pulse code modulation (PCM)) at step 418 and sent to the digital to analog converter 38.

At step 420 the digital audio or video data is converted to analog audio or video signals by the digital to analog converter 38. The analog signals are output to an analog input device 44 (e.g., stereo amplifier, video cassette recorder, sound card or television) for playback/viewing. As illustrated in FIG. 13A, the process of sending encrypted data to the decryption/decoding device 30 may loop through steps 408 through 420 until all of the data is read from the media 28. After all of the protected electronic data has been converted to an analog output, the process ends at step 424.

In accordance with the second hardware implementation, the protected data may be streamed from the PC 20 to the decryption/decompressing device 30, or alternatively, download to the RAM 39 in its entirety prior to decryption by the ASIC/controller 36.

As noted above, the data is stored on the media 28 in an encrypted format using at least the unique serial number as a decryption key. The encryption/decryption key may also be a compound key that includes the unique serial number of the media, vendor information and user information. Accordingly, if the data is copied to any other media, the decryption process will fail rendering the content unusable. Thus, unauthorized copying of data downloaded using the apparatus and method of the present invention will be prevented. Further, while process described above refers to a client PC, the process is applicable to a stand alone device capable of communicating over the network infrastructure, and reading and writing to the media on which the protected electronic data is stored. For example, a kiosk may be provided at retail outlets where purchasers may insert a piece of media 28 into the kiosk-and download data to be used on a home or office personal computer.

In accordance with the present invention, the server 16 may store digital content to be downloaded in an encrypted or unencrypted format. If the digital content to be downloaded is not stored in an encrypted format, then it is preferably encrypted upon downloading using the unique serial number or compound key as an encryption key. If the digital content to be download is stored on the server 16 in an encrypted format (pre-encrypted) prior to downloading then the server would need only to encrypt the data key to the content (i.e., the software application, music or video). Pre-encryption may be preferable to provide greater performance in environments where large amounts of data need to be encrypted per transaction. Such electronic distribution systems may be heavily burdened if 5 they were required to encrypt the entire content that is to be electronically distributed. However, it may be preferable to double encrypt the downloaded content at step 308 by encrypting the pre-encrypted content and the data key to the pre-encrypted content using the unique serial identifier or compound key (and any additional information) as an encryption key. Such a technique would greatly increase the security of the data to be transmitted, as the data may be double encrypted prior to transmission to the client, as noted above. While the process at step 308 has identified encrypting the data key or the data key and the content, it is also possible that at step 308 that only the content to be transmitted is encrypted using-the unique serial number or compound key as a key. If enhanced security is a concern, additional transaction information such as the purchaser's name, address, credit card number; etc. may be included with the content.

Further in accordance with the present invention, it is anticipated that many home users will desire to copy audio CDs to other media, such as the omega ZIP® disk, for use in portable devices. Such devices include those that utilize MPEG audio layer 3 (MP3) compression, which will provide near CD-quality sound. The present invention contemplates performing the operations of FIGS. 7 and 11 entirely within client PCs 20 or stand-alone devices 22, without any interaction with other devices connected to the network infrastructure 12. Accordingly, the PC 20 would query the media 28 for the unique serial number (see, description of Step 302) and pass it to an application program, via controller 72 and processor 66. The serial number may then be stored in the RAM 64 and used by the application program (also in RAM 64) to encrypt the digital audio from the CD using the unique identifier (or compound key) as an encryption key. The application software writes the encrypted data stream to the media 28 via media drive 52 using know means of transferring information from one media type to another within a PC 20. Such a system prevents illegal copying of copyrighted materials by preventing the manufacture of subsequent generations of the first generation copy written to the media 28.

As described herein, the present invention advantageously utilizes at least the unique identifier of the media as an encryption key which allows any electronic data to be protected against copying. Additionally, by using the unique identifier of the media, rather than a hardware device, the protected electronic data may be read/played on any device 5 capable of reading the media. Further, a compound key may be used for added security. Thus, the protected electronic data becomes portable and is tied only to a single removable media, allowing the protected electronic data to be shared while preventing the protected electronic data from being copied and read/played from another media. Further, present invention may be used in a single encryption method or multiple encryption method where the key to the protected electronic data itself is encrypted using the serial number of the disk as the key.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, fixed media having a unique identifier may be utilized by the present invention to receive protected electronic data. Also, the removable media need not be a removable media cartridge, but may comprise a removable drive, such as those which are removably connected to personal computers or other devices via, e. g., drive bays, device bays, and PCMCIA slots.

What we claim is:

1. A method of accessing encrypted electronic data stored on a media, said method comprising:

accessing electronic data on said media;
determining that said electronic data is encrypted electronic data;
obtaining a unique identifier permanently recorded on said media;
generating a compound key in accordance with a predetermined operation using said unique identifier as input;
reading at least a portion of said encrypted electronic data from said media;
decrypting said encrypted electronic data using said compound key as a decryption key;
reading said unique identifier from a predetermined track of said media;
obtaining vendor information; and
obtaining user information,
wherein said unique identifier, said vendor information and said user information are used by said predetermined operation to generate said compound key.

2. A method of accessing encrypted electronic data stored on a media, said method comprising:

accessing electronic data on said media;
determining that said electronic data is encrypted electronic data;
obtaining a unique identifier permanently recorded on said media;
generating a compound key in accordance with a predetermined operation using said unique identifier as input;
reading at least a portion of said encrypted electronic data from said media;
decrypting said encrypted electronic data using said compound key as a decryption key;
wherein said generating said compound key further comprises communicating said compound key to a second device, and said reading at least a portion of said electronic data further comprises communicating said portion of said electronic data to said second device, wherein said second device performs said decrypting said electronic data using said compound key as a decryption key;
communicating from said second device an authentication code;
receiving said authentication code;
determining that said authentication code is the same as said unique identifier;
generating a verification code; and
communicating said verification code to said second device.

3. An apparatus for reading encrypted electronic data associated to one piece of media, comprising:

a processor which controls and executes instructions to read electronic data and a unique identifier from said one piece of media,
said processor configured to generate a compound key with a predetermined operation using said unique identifier and vendor information and user information as input,
said unique identifier permanently recorded on said one piece of media; and
a media drive, responsive to said processor,
said media drive configured to
read said unique identifier,
read at least a portion of said encrypted electronic data associated to said one piece of media, wherein said encrypted electronic data is decrypted for use by said apparatus or another device attached to said apparatus using said compound key as a decryption key, and wherein said decrypted electronic data is accessible from only said one piece of media having said unique identifier.

4. A method of electronically distributing electronic data from a first media to a second media within a device, said method comprising:

accessing said second media;

reading a unique identifier from a predetermined location on said second media, said unique identifier permanently recorded on said second media;

obtaining vendor information;

obtaining user information;

generating a compound key in accordance with a predetermined operation using said unique identifier, said vendor information, and said user information as input;

reading said electronic data from said first media;

encrypting said electronic data using said compound key as an encryption key; and writing said encrypted electronic data to said second media, such that information represented by said encrypted electronic data may be accessed for use from only said second media, and wherein data on said second media other than said encrypted electronic data may be copied to and accessed from another medium, free of encryption constraints imposed upon said encrypted electronic data.

* * * * *